(12) United States Patent
Senoo et al.

(10) Patent No.: US 11,189,841 B2
(45) Date of Patent: Nov. 30, 2021

(54) METHOD FOR PRODUCING ELECTRODE CATALYST, AND ELECTRODE CATALYST

(71) Applicant: MITSUI MINING & SMELTING CO., LTD., Tokyo (JP)

(72) Inventors: Yuichi Senoo, Saitama (JP); Koichi Miyake, Saitama (JP); Koji Taniguchi, Saitama (JP); Hiromu Watanabe, Saitama (JP); Naohiko Abe, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 16/336,129

(22) PCT Filed: Sep. 29, 2017

(86) PCT No.: PCT/JP2017/035712
§ 371 (c)(1),
(2) Date: Mar. 25, 2019

(87) PCT Pub. No.: WO2018/066485
PCT Pub. Date: Apr. 12, 2018

(65) Prior Publication Data
US 2019/0229345 A1    Jul. 25, 2019

(30) Foreign Application Priority Data
Oct. 5, 2016  (JP) .............. JP2016-197622

(51) Int. Cl.
*H01M 4/80*    (2006.01)
*H01M 4/88*    (2006.01)
(Continued)

(52) U.S. Cl.
CPC ............. *H01M 4/881* (2013.01); *H01M 4/86* (2013.01); *H01M 4/88* (2013.01); *H01M 4/8807* (2013.01);
(Continued)

(58) Field of Classification Search
CPC .......... H01M 4/881; H01M 4/86; H01M 4/90; H01M 4/88; H01M 8/10; H01M 4/92;
(Continued)

(56) References Cited

U.S. PATENT DOCUMENTS 7,098,163 B2    8/2006    Hampden-Smith et al.
7,642,213 B2    1/2010    Hampden-Smith et al.
(Continued)

FOREIGN PATENT DOCUMENTS

| JP | 2002-280002 A | 9/2002 |
| JP | 2006-253042 A | 9/2006 |

(Continued)

OTHER PUBLICATIONS

Elezovic et al. "Pt nanoparticles on tin oxide based support as a beneficial catalyst for oxygen reduction in alkaline solutions." RSC Adv., 2015, 5, 15923. (Year: 2015).*

(Continued)

*Primary Examiner* — Michael L Dignan
(74) *Attorney, Agent, or Firm* — Nixon & Vanderhye

(57) ABSTRACT

This method for producing an electrode catalyst includes: a dispersion liquid preparation step wherein a dispersion liquid is prepared by mixing (i) at least one solvent selected from the group consisting of sulfoxide compounds and amide compounds, (ii) a catalyst carrier powder composed of a metal oxide, (iii) a platinum compound, (iv) a transition metal compound and (v) an aromatic compound that contains a carboxyl group; a loading step wherein the dispersion liquid is heated so that a platinum alloy of platinum and a (Continued)

Example 1 transition metal is loaded on the surface of the catalyst carrier powder; a solid-liquid separation step wherein a dispersoid is separated from the dispersion liquid after the loading step, thereby obtaining a catalyst powder wherein the catalyst carrier powder is loaded with the platinum alloy; and a heat treatment step wherein the catalyst powder is heated under vacuum or in a reducing gas atmosphere.

11 Claims, 13 Drawing Sheets

(51) Int. Cl.
*H01M 8/1004* (2016.01)
*H01M 4/92* (2006.01)
*H01M 4/86* (2006.01)
*H01M 4/90* (2006.01)
*H01M 8/10* (2016.01)

(52) U.S. Cl.
CPC .............. *H01M 4/90* (2013.01); *H01M 4/92* (2013.01); *H01M 4/926* (2013.01); *H01M 8/10* (2013.01); *H01M 8/1004* (2013.01); Y02P 70/50 (2015.11)

(58) Field of Classification Search
CPC .. H01M 4/8807; H01M 8/1004; H01M 4/926; H01M 4/921; H01M 2008/1095; H01M 4/8882; H01M 4/885; H01M 4/925; H01M 4/8828; Y02P 70/50
See application file for complete search history.

(56) References Cited

U.S. PATENT DOCUMENTS

| | | | |
|---|---|---|---|
| 7,713,899 B2 | 5/2010 | Hampden-Smith et al. | |
| 2004/0038808 A1 | 2/2004 | Hampden-Smith et al. | |
| 2006/0258527 A1 | 11/2006 | Yoo et al. | |
| 2006/0264319 A1 | 11/2006 | Yoo et al. | |
| 2008/0254974 A1 | 10/2008 | Nakano et al. | |
| 2010/0233574 A1* | 9/2010 | Masao | H01M 4/92 429/487 |
| 2013/0053239 A1 | 2/2013 | Carpenter | |
| 2013/0085061 A1 | 4/2013 | Stamenkovic et al. | |
| 2015/0202598 A1* | 7/2015 | Kallesoe | B01J 35/026 429/524 |
| 2015/0221953 A1* | 8/2015 | Ramani | H01M 4/9075 429/524 |
| 2016/0240862 A1* | 8/2016 | Ishida | H01M 4/8825 |
| 2018/0123138 A1* | 5/2018 | Huang | H01M 4/926 |
| 2018/0305217 A1 | 10/2018 | Yoneda et al. | |
| 2019/0336956 A1* | 11/2019 | Suzue | H01M 4/8828 |

FOREIGN PATENT DOCUMENTS

| | | |
|---|---|---|
| JP | 2006-524898 A | 11/2006 |
| JP | 2008-243436 A | 10/2008 |
| KR | 10-0774590 B1 | 11/2007 |
| KR | 10-0988681 B1 | 10/2010 |
| WO | 2004/095603 A2 | 11/2004 |
| WO | 2006/137579 A1 | 12/2006 |
| WO | 2015/146454 A1 | 10/2015 |
| WO | 2016/098399 A1 | 6/2016 |

OTHER PUBLICATIONS

Extended European Search Report issued in European Patent Application No. 17858323.3 dated Jun. 30, 2020.
Feng, Y. et al., "Platinum catalysts promoted by In doped $SnO_2$ support for methanol electrooxidation in alkaline electrolyte," Journal of Power Sources 252 (2014) 156-163.
Fu, X. et al., "Pt-rich shell coated Ni nanoparticles as catalysts for methanol electro-oxidation in alkaline media," Catalysis Communications 10 (2009) 1893-1897.
Huang, X. et al., "A rational design of carbon-supported dispersive Pt-based octahedra as efficient oxygen reduction reaction catalysts," Energy Environ. Sci., 2014, 7, 2957.
International Search Report, dated Nov. 14, 2017, from corresponding PCT application No. PCT/JP2017/035712.
Wu et al., "Syntheses of Water-Soluble Octahedral, Truncated Octahedral, and Cubic Pt—Ni Nanocrystals and Their Structure-Activity Study in Model Hydrogenation Reactions," Journal of the American Chemical Society, vol. 134, 2012, pp. 8975-8981.

* cited by examiner

Fig. 2
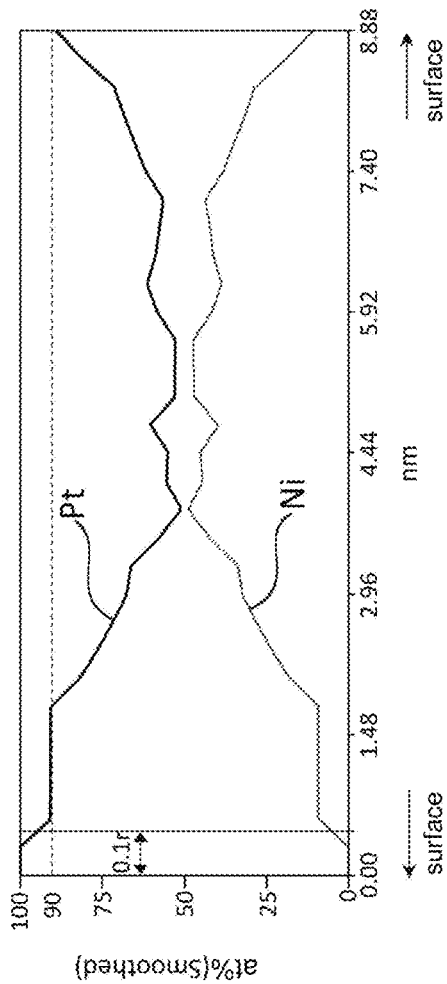
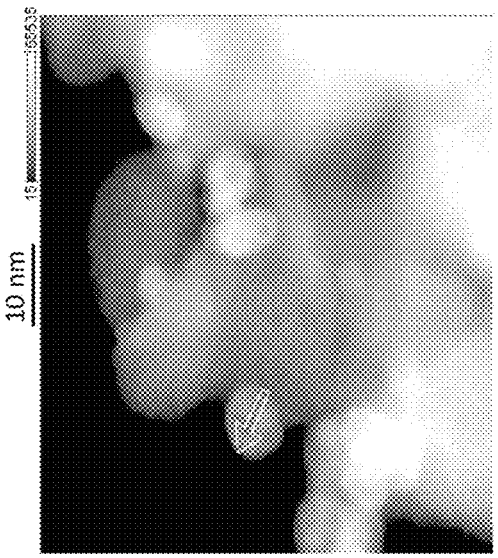

Fig. 3
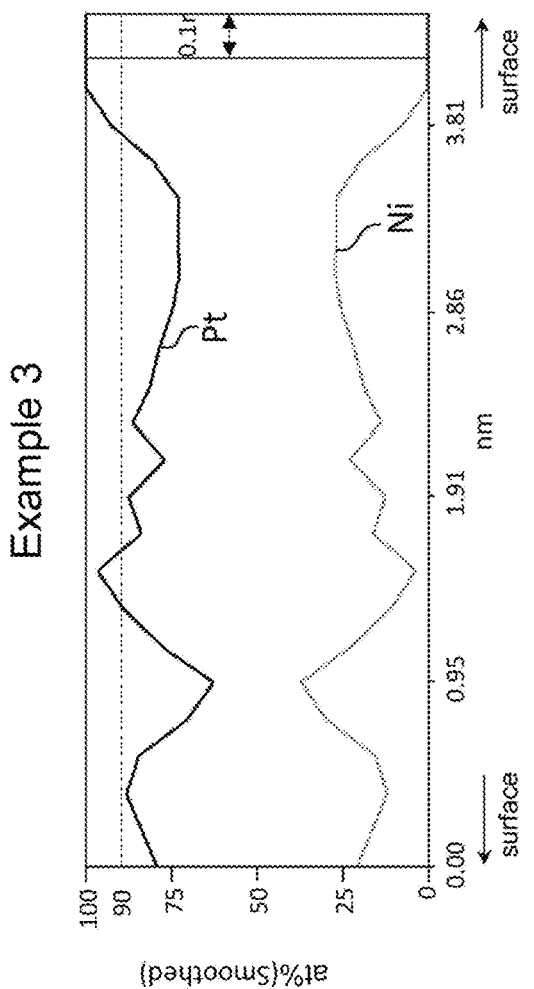
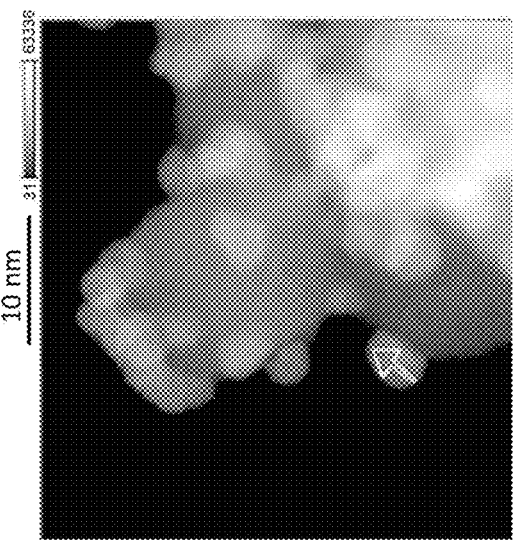

Fig.4
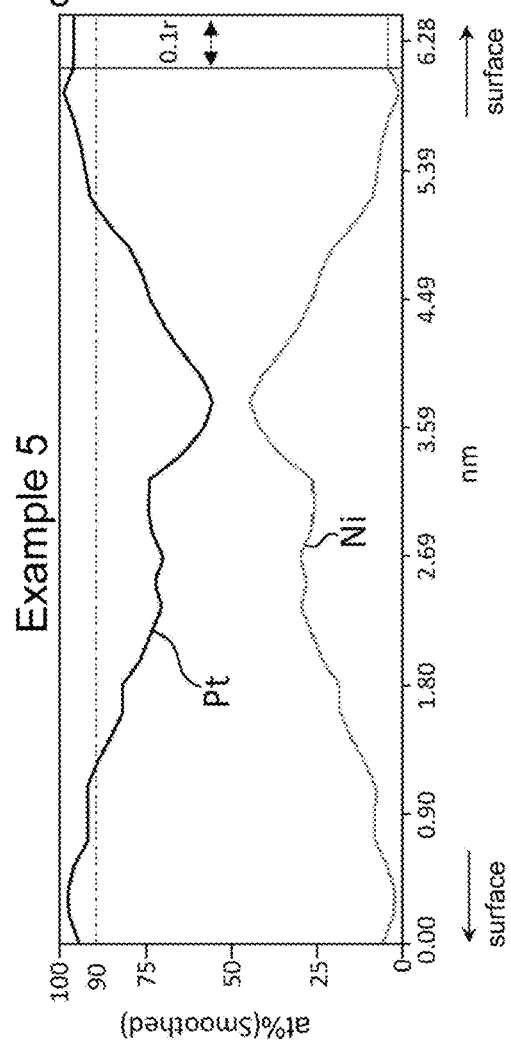
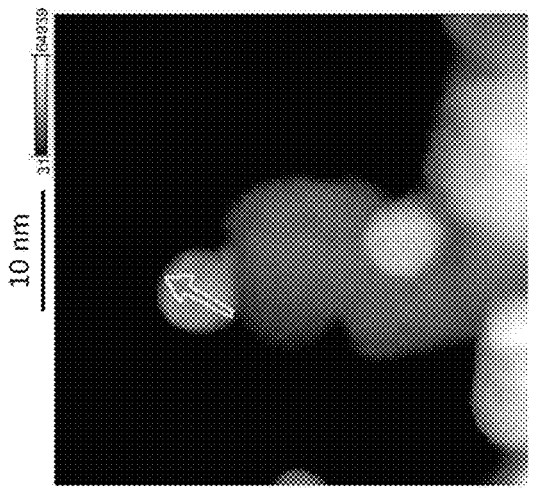

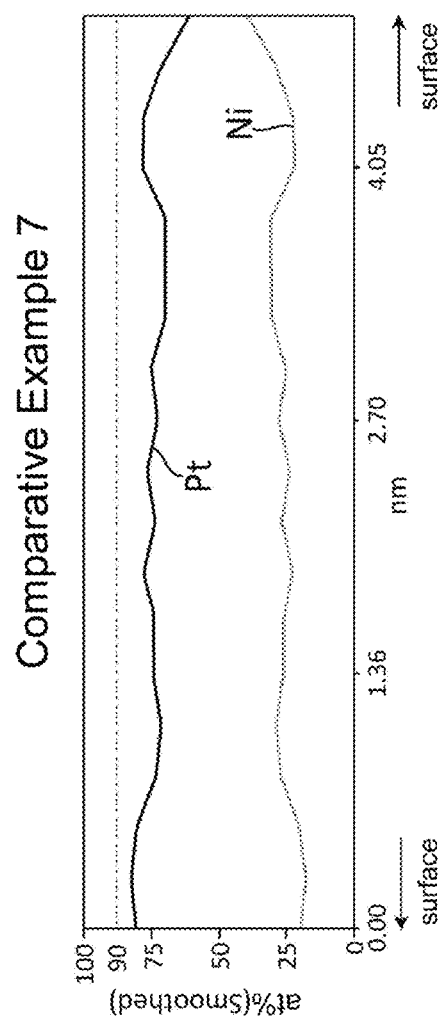
Fig. 13
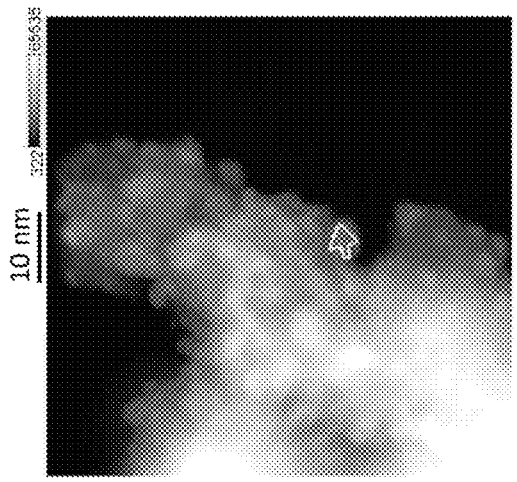

METHOD FOR PRODUCING ELECTRODE CATALYST, AND ELECTRODE CATALYST

TECHNICAL FIELD

The present invention relates to a method for producing an electrode catalyst that is suitably used in a fuel cell. Also, the present invention relates to an electrode catalyst.

BACKGROUND ART

Solid polymer electrolyte fuel cells include a membrane electrode assembly that is composed of a proton-conducting polymer membrane made of a perfluoroalkyl sulfonate polymer or the like, which is used as a solid electrolyte, and an oxygen electrode and a fuel electrode that are formed on respective sides of the solid polymer membrane and include an electrode catalyst.

In general, the electrode catalyst is composed of a conductive carbon material, such as carbon black, as a support, and any of various noble metal catalysts, such as platinum, supported on the conductive carbon material. It is known that, in the electrode catalyst, changes in potential during the operation of a fuel cell lead to oxidative corrosion of the carbon, which results in aggregation or detachment of the metal catalyst supported thereon. Consequently, the performance of the fuel cell deteriorates with the passage of operation time. To address this issue, in the production of a fuel cell, a noble metal catalyst in an amount greater than that actually necessary is supported on the support, to thereby allow a margin for performance and increase the life of the fuel cell. However, this is not advantageous in terms of economic efficiency.

Therefore, in order to enhance the performance of solid polymer electrolyte fuel cells, increase the life thereof, improve the economic efficiency thereof, and so on, various studies regarding electrode catalysts have been conducted. For example, the use of a conductive oxide support, which is a non-carbon material, instead of conductive carbon, which has conventionally been used as supports, has been proposed (see Patent Literature 1). In this patent literature, a tin oxide is used as the support of the electrode catalyst. Fine particles of a noble metal such as platinum are supported on the support. The above patent literature purports that this electrode catalyst has excellent electrochemical catalytic activity and also a high degree of durability. According to this patent literature, the fine particles of the noble metal are generated by subjecting a colloid of the noble metal to heat treatment at 80° C. to 250° C. in a reducing atmosphere.

CITATION LIST

Patent Literature

Patent Literature 1: US 2010/233574A1

SUMMARY OF INVENTION

The inventors of the present invention have conducted a study on the performance of the electrode catalyst disclosed in Patent Literature 1, and found that there is room for improvement in the catalyst performance such as the kinetic current density. Then, the inventors of the present invention have considered that the catalytic performance of an electrode catalyst is improved by supporting a platinum-nickel alloy, which has a higher degree of catalytic activity than platinum, on a tin oxide, and attempted to produce an electrode catalyst composed of a tin oxide and a platinum-nickel alloy supported thereon according to the method disclosed in Patent Literature 1. However, in the method disclosed in this patent literature, it is necessary to subject precursors of a platinum metal and a nickel metal supported on the tin oxide to heat treatment at a high temperature of, for example, 200° C. or more in a reducing atmosphere, in order to dissolve nickel in platinum to form a solid solution. Thus, during the heat treatment, platinum was alloyed not only with nickel but also with tin in the tin oxide, and desired catalytic performance has not been provided.

Therefore, an object of the present invention is to provide a method for producing an electrode catalyst that can eliminate the above-described various drawbacks of the conventional arts.

The present invention provides a method for producing an electrode catalyst, the method including:

a dispersion preparation step of mixing (i) at least one solvent selected from the group consisting of sulfoxide compounds and amide compounds, (ii) a catalyst support powder comprising a metal oxide, (iii) a platinum compound, and (iv) a transition metal compound, to thereby prepare a dispersion;

a supporting step of heating the dispersion, to thereby support a platinum alloy of platinum and the transition metal on the catalyst support powder;

a solid-liquid separation step of separating a dispersoid from the dispersion after the supporting step, to thereby obtain a catalyst powder including the catalyst support powder and the platinum alloy supported thereon; and a heat treatment step of heating the catalyst powder under vacuum or in a reducing gas atmosphere.

Also, the present invention provides an electrode catalyst including a tin oxide support and particles of a platinum alloy of platinum and a transition metal supported thereon, wherein each of the platinum alloy particles includes a surface region and a central region that is located closer to the center of the platinum alloy particle than the surface region, and has a platinum-concentrated layer in the surface region, in a diffraction pattern obtained by X-ray diffractometry on the electrode catalyst, a peak assigned to the (200) plane of the platinum alloy is at a diffraction angle $2\theta$ of 46.5° to 48.0° inclusive, and the electrode catalyst has a degree of metallization of Sn of 5% or less in an analysis region including the surface of the electrode catalyst and a subregion neighbouring the surface, as measured through X-ray photoelectron spectroscopy, the degree of metallization being defined by an equation (1) below:

$$\text{Degree of metallization of Sn (\%)} = R_{Sn\text{-}metal} / (R_{Sn\text{-}metal} + R_{Sn\text{-}oxide}) \times 100 \quad (1)$$

where $R_{Sn\text{-}metal}$ is the area assigned to metallic Sn in a spectrum derived from the Sn $3d_{5/2}$ orbital obtained through X-ray photoelectron spectroscopy, and $R_{Sn\text{-}oxide}$ is the area assigned to an Sn oxide in the spectrum derived from the Sn $3d_{5/2}$ orbital obtained through X-ray photoelectron spectroscopy.

BRIEF DESCRIPTION OF DRAWINGS

FIG. 2 shows the results of line analysis conducted using an STEM image and the results of EDS mapping, on a catalyst fine particle in the electrode catalyst obtained in Example 2.

FIG. 3 shows the results of line analysis conducted using an STEM image and the results of EDS mapping, on a catalyst fine particle in the electrode catalyst obtained in Example 3.

FIG. 4 shows the results of line analysis conducted using an STEM image and the results of EDS mapping, on a catalyst fine particle in the electrode catalyst obtained in Example 5.

FIG. 13 shows the results of line analysis conducted using an STEM image and the results of EDS mapping, on to a catalyst fine particle in the electrode catalyst obtained in Comparative Example 7.

DESCRIPTION OF EMBODIMENTS

Figure 1:
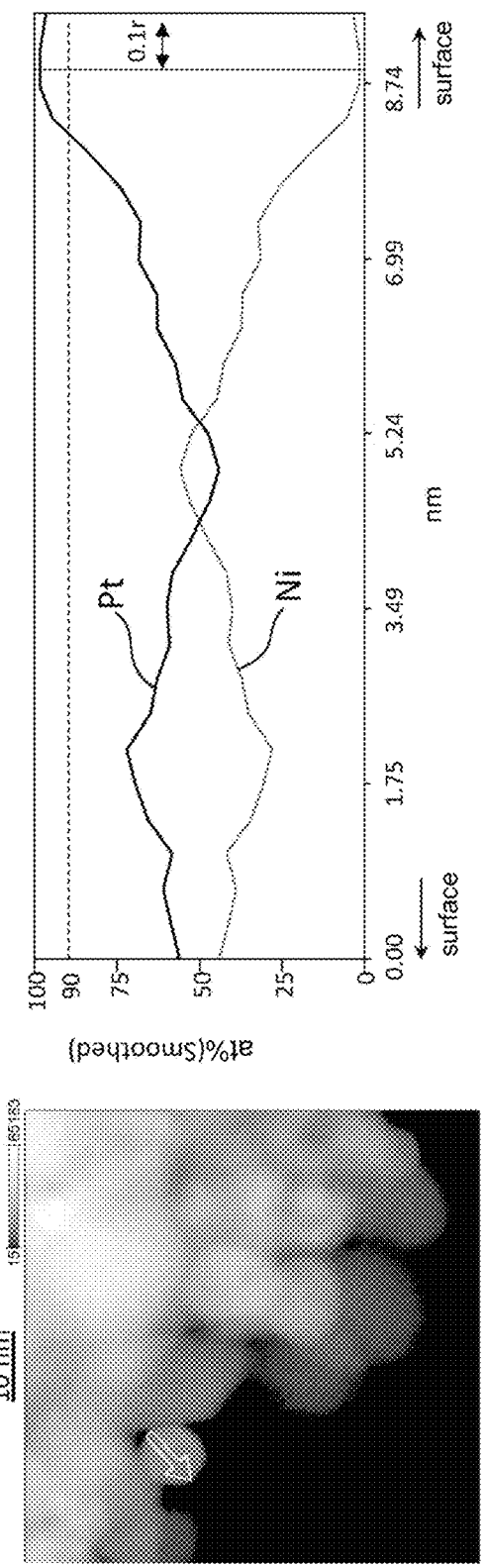
FIG. 1 shows the results of line analysis conducted using an STEM image and the results of EDS mapping, on a catalyst fine particle in the electrode catalyst obtained in Example 1.
Figure 5:
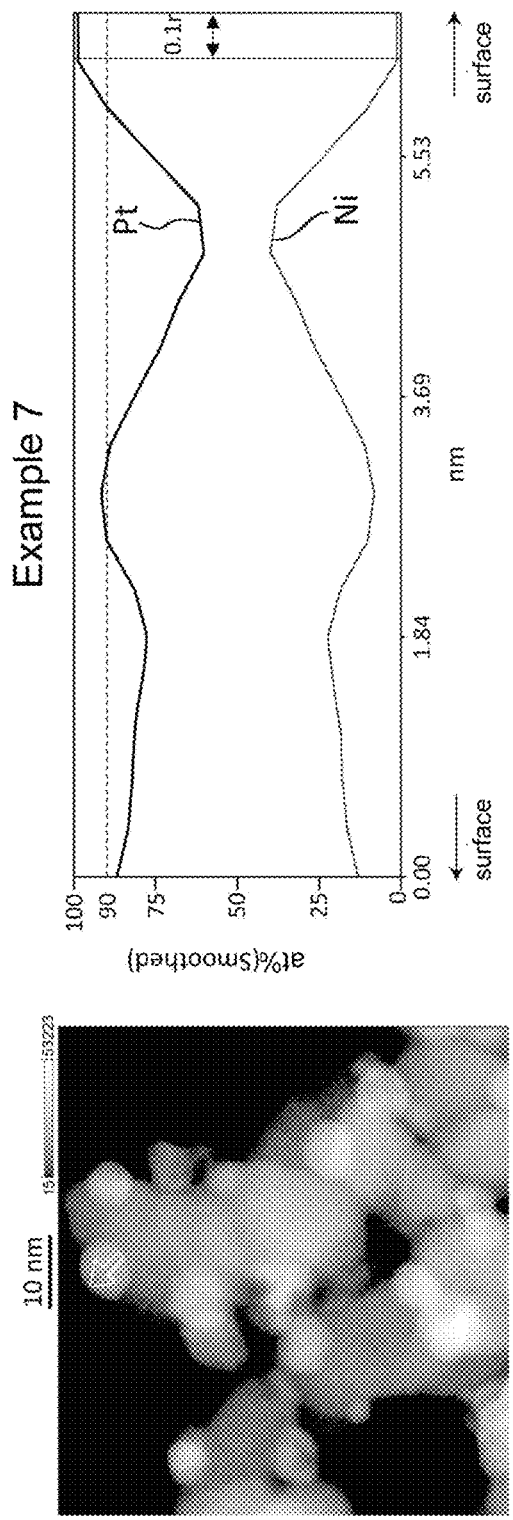
FIG. 5 shows the results of line analysis conducted using an STEM image and the results of EDS mapping, on a catalyst fine particle in the electrode catalyst obtained in Example 7.
Figure 6:
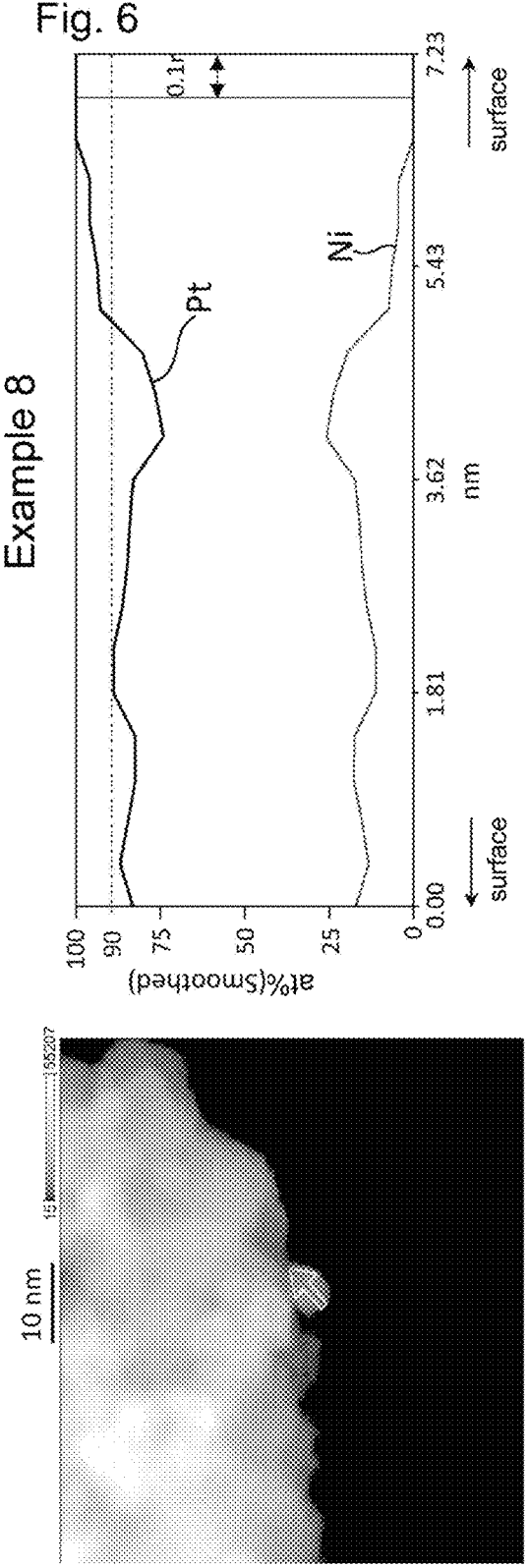
FIG. 6 shows the results of line analysis conducted using an STEM image and the results of EDS mapping, on a catalyst fine particle in the electrode catalyst obtained in Example 8.

Hereinafter, the present invention will be described by way of preferred embodiments thereof. An electrode catalyst to be produced in the present invention has a structure in which a catalyst is supported on a support. A conductive metal oxide is suitably used as the support. In the present invention, "conductive" means that a metal oxide has a volume resistivity of $1 \times 10^4$ Ω·cm or less under a pressure of 57 MPa. A platinum alloy of platinum and a transition metal is suitably used as the catalyst that is supported on the support. An electrode catalyst produced according to the present invention is suitably used as catalysts for various types of fuel cells. A typical example of those fuel cells is a solid polymer electrolyte fuel cell.

A production method of the present invention includes a dispersion preparation step of mixing (i) at least one solvent selected from the group consisting of sulfoxide compounds and amide compounds, (ii) a catalyst support powder composed of a metal oxide, (iii) a platinum compound, and (iv) a transition metal compound, to thereby prepare a dispersion; a supporting step of heating the dispersion, to thereby support a platinum alloy of platinum and the transition metal on the catalyst support powder; a solid-liquid separation step of separating a dispersoid from the dispersion after the supporting step, to thereby obtain a catalyst powder comprising the catalyst support powder and the platinum alloy supported thereon; and a heat treatment step of heating the catalyst powder under vacuum or in a reducing gas atmosphere.

The inventors of the present invention consider that the reason why an electrode catalyst having excellent catalytic performance can be obtained according to the production method of the present invention is as follows: the platinum compound and the transition metal compound can be reduced to generate an alloy of the two compounds at an even lower temperature due to the reducing effect of the solvent when heating the dispersion, so that platinum and the metallic element of the metal oxide as the catalyst support can be suppressed from being alloyed with each other; and also, when heating the catalyst powder under vacuum or in a reducing gas atmosphere after the solid-liquid separation step, the alloyed state of the surfaces of the particles of the platinum alloy of platinum and the transition metal changes, resulting in that the platinum alloy has an even higher degree of catalyst activity, and the catalytic performance is thus even highly enhanced.

The production method of the present invention is broadly divided into the dispersion preparation step (A), the supporting step (B), the solid-liquid separation step (C), and the heat treatment step (D). Hereinafter, the individual steps will be described in detail.

In the dispersion preparation step (A), a dispersion is prepared by mixing the following components (i) to (iv) as constituent components thereof:

(i) at least one solvent selected from the group consisting of sulfoxide compounds and amide compounds;
(ii) a catalyst support powder comprising a metal oxide;
(iii) a platinum compound; and
(iv) a transition metal compound.

For example, the components (i) to (iv) can be collectively put into a vessel or the like and mixed. Alternatively, the components (ii) to (iv) can be added to the component (i) and mixed. The order of adding the components is not critical in the present invention, and can be determined as appropriate, depending on the characteristics of the individual components and the mixing ratio of the components.

In the dispersion preparation step, the at least one solvent (i) selected from the group consisting of sulfoxide compounds and amide compounds is added preferably such that the content of the solvent is preferably from 30 to 99.9 mass % inclusive, more preferably from 40 to 99.7 mass % inclusive, and even more preferably from 50 to 99 mass % inclusive, with respect to the total mass of the dispersion to be prepared. An additional solvent other than the above-described solvent may also be contained in the dispersion as long as the effects of the present invention are not impaired.

In the dispersion preparation step, the catalyst support powder comprising the metal oxide powder (ii) is added preferably such that the content of the catalyst support powder is preferably from 0.1 to 500 g/L inclusive, more preferably from 1 to 150 g/L inclusive, and even more preferably from 2 to 100 g/L inclusive, with respect to the volume of the solvent in the dispersion to be prepared.

In the dispersion preparation step, the platinum compound (iii) is added preferably such that the content of the platinum compound is preferably from $2.5 \times 10^{-4}$ to 1.2 mol/L inclusive, more preferably from $6.0 \times 10^{-4}$ to $8.0 \times 10^{-1}$ mol/L inclusive, and even more preferably from $1.5 \times 10^{-3}$ to $8.0 \times 10^{-2}$ mol/L inclusive, with respect to the volume of the solvent in the dispersion to be prepared.

In the dispersion preparation step, the transition metal compound (iv) is added preferably such that the content of the transition metal compound is preferably from $4.0 \times 10^{-4}$ to $2.0 \times 10^{-1}$ mol/L inclusive, more preferably from $6.0 \times 10^{-4}$ to $1.2 \times 10^{-1}$ mol/L inclusive, and even more preferably from $2.0 \times 10^{-3}$ to $6.0 \times 10^{-2}$ mol/L inclusive, with respect to the volume of the solvent in the dispersion to be prepared.

In the dispersion preparation step, an aromatic compound having a carboxyl group may further be mixed in addition to the above-described components. When an aromatic compound having a carboxyl group is contained in the dispersion, the reduction of platinum and the transition metal in the supporting step (B) proceeds even more successfully, and thus, the solid solution state of the platinum alloy becomes even more uniform, which leads to highly enhanced catalytic performance of the electrode catalyst to be obtained.

In the dispersion preparation step, the aforementioned aromatic compound having a carboxyl group is added preferably such that the content of the aromatic compound is preferably from $4.0 \times 10^{-4}$ to 4.0 mol/L inclusive, more preferably from $2.0 \times 10^{-2}$ to 3.0 mol/L inclusive, and even more preferably from $4.0 \times 10^{-2}$ to 2.0 mol/L inclusive, with respect to the volume of the solvent in the dispersion to be prepared.

The at least one solvent (i) selected from the group consisting of sulfoxide compounds and amide compounds is used as a solvent for dissolving the platinum compound (iii) and the transition metal compound (iv) in the dispersion preparation step, and is also used as a reductant for reducing the platinum compound (iii) and the transition metal compound (iv). In view of these, examples of a sulfoxide compound serving as the solvent (i) include dimethyl sulfoxide. Examples of an amide compound serving as the solvent include lactam compounds (intramolecular cyclic amide compounds) such as N-methyl-2-pyrrolidone, N-ethyl-2-pyrrolidone, N-propyl-2-pyrrolidone, and N-hydroxyethyl-2-pyrrolidone; and noncyclic amide compounds such as N,N-dimethylformamide, N-methylformamide, N,N-diethylformamide, N-ethylformamide, N,N-dimethylacetamide, and N,N-diethylacetamide. Among these, preferred are organic compounds having a formamide group, such as formamide, N,N-dimethylformamide, N-methylformamide, N,N-diethylformamide, and N-ethylformamide, which are amide compounds, in view of easily forming an electrode catalyst that has excellent catalytic performance such as kinetic current density. These solvents can be used singly or in a combination of two or more.

In the dispersion preparation step, the catalyst support powder comprising the metal oxide powder (ii) is an aggregate of the metal oxide particles for the support (hereinafter also referred to as "support particles"). Particles of a conductive metal oxide can be used as the support particles. Examples of the conductive metal oxide include indium-based oxides, tin-based oxides, titanium-based oxides, zirconium-based oxides, selenium-based oxides, tungsten-based oxides, zinc-based oxides, vanadium-based oxides, tantalum-based oxides, niobium-based oxides, and rhenium-based oxides. Examples of a further preferable inorganic oxide include tin oxides containing at least one element selected from halogens such as fluorine and chlorine, niobium, tantalum, antimony, and tungsten. Specific examples thereof include metal- or nonmetal-containing (doped) tin oxides such as a tin-containing indium oxide, an antimony-containing tin oxide, a fluorine-containing tin oxide, a tantalum-containing tin oxide, an antimony-and-tantalum-containing tin oxide, a tungsten-containing tin oxide, a fluorine-and-tungsten-containing tin oxide, and a niobium-containing tin oxide. In particular, it is preferable that the support particles be made of a ceramic material containing a tin oxide, in view of the stability of the substance in a power generation environment of a solid polymer electrolyte fuel cell.

The support particles made of a conductive metal oxide can be produced using various methods. These production methods are broadly divided into wet methods and dry methods. In view of producing fine support particles, it is advantageous to employ a wet method. As an example of the wet method, the following method is preferably employed when producing support particles made of a tin oxide containing a halogen. Details of this production method can be found in WO 2016/098399, for example.

The primary particle size of the support particles is preferably from 5 to 200 nm inclusive, more preferably from 5 to 100 nm inclusive, and even more preferably from 5 to 50 nm inclusive. The primary particle size of the support can be an average value of the particle sizes of primary particles of the support that are determined from an electron microscope image or through small angle X-ray scattering. For example, the primary particle size of the support can be obtained by observing the support particles in an electron microscope image, measuring the maximum transverse lengths of 500 or more particles, and calculating the average value of the maximum transverse lengths.

In the dispersion preparation step, the platinum compound (iii) is preferably, but not limited to, a platinum compound that can be dissolved in the at least one solvent (i) selected from the group consisting of sulfoxide compounds and amide compounds. For example, a platinum complex or a platinum salt can be used as the platinum compound (iii). Specific examples of the platinum compound include bis(acetylacetonato)platinum(II), which is a platinum complex, hexachloroplatinic(IV) acid, tetrachloroplatinic(II) acid, diamminedinitritoplatinum(II), tetraammineplatinum(II) dichloro hydrate, and hexahydroxoplatinic(IV) acid.

In the dispersion preparation step, the transition metal compound (iv) is preferably, but not limited to, a transition metal compound that can be dissolved in the at least one solvent (i) selected from the group consisting of sulfoxide compounds and amide compounds. For example, a transition metal complex or a transition metal salt can be used as the transition metal compound (iv). Examples of the transition metal include, but are not limited to, nickel, cobalt, iron, chromium, titanium, vanadium, manganese, copper, zinc, and scandium. A single transition metal compound can be used alone, or two or more transition metal compounds can be used in combination. Among the aforementioned transition metals, a compound of nickel, cobalt, iron, or chromium is preferably used because an alloy of platinum and such a compound has a high degree of catalytic activity.

As will be described later, when the solvent (i) is an organic compound having a formamide group, the transition metal compound (iv) may have water of crystallization. An example of a transition metal compound that does not have water of crystallization is bis(2,4-pentanedionato)nickel(II), which is a type of nickel complex. Examples of a transition metal compound that has water of crystallization include bis(2,4-pentanedionato)nickel(II).dihydrate and nickel(II)

hexafluoroacetylacetonate hydrate, which are a nickel complex, and nickel acetate.tetrahydrate, nickel nitrite.hexahydrate, and nickel chloride.hexahydrate, which are nickel salts.

The aromatic compound having a carboxyl group, which may be additionally used in the dispersion preparation step, is a compound that has at least one aromatic ring and at least one carboxyl group that is bound to the aromatic ring directly or indirectly via a binding group. Examples of the aromatic ring include a benzene ring, a naphthalene ring, and an anthracene ring. A heterocycle that contains at least one of nitrogen, oxygen, or other atoms and has aromaticity also falls under the category of the aromatic ring. Specific examples of the aromatic compound having a carboxyl group include benzoic acid, phthalic acid, terephthalic acid, salicylic acid, and acetylsalicylic acid. These aromatic compounds can be used singly or in a combination of two or more.

When the aromatic compound having a carboxyl group, which may be additionally added, is contained in the dispersion, the reduction of platinum and the transition metal in the supporting step (B) proceeds even more successfully, and thus, the platinum alloy in even more uniform solid solution state is provided. Consequently, the catalytic performance of the electrode catalyst to be produced is highly enhanced.

The dispersion that has been prepared using the above-described components is subjected to the supporting step (B) to thereby support the platinum alloy of platinum and the transition metal as the catalyst on the particles of the catalyst support powder. The supporting of the catalyst can be achieved by heating the dispersion. The dispersion can be open-heated under atmospheric pressure, or alternatively, the dispersion can be heated in a hermetically closed condition. In the case where the dispersion is open-heated under atmospheric pressure, the heating may be performed while refluxing a volatile component.

Prior to heating the dispersion in the supporting step, the components contained in the dispersion are preferably dispersed sufficiently uniformly, because this enables the catalyst to be uniformly supported on the support particles. For this purpose, the dispersion is preferably subjected to a dispersing treatment by ultrasonication prior to heating the dispersion in the supporting step. The ultrasonication is preferably performed in an unheated condition, for example, at a temperature from 15° C. to 25° C. inclusive.

After the above-described dispersing treatment of the dispersion, the dispersion is preferably stirred preliminarily before heating the dispersion in the supporting step. The preliminary stirring is performed mainly for the purposes of uniformly mixing the support and the other raw materials and causing a precursor to adsorb to the support. The preliminary stirring can be performed by, for example, submerging a magnetic stirrer in the dispersion and rotating the stirrer using a magnetic stirring apparatus placed on the outside. Alternatively, the preliminary stirring can be performed by disposing a stirring blade in the dispersion and rotating the stirring blade. In either case, the preliminary stirring is preferably performed in an unheated condition, and is preferably performed at a temperature from 15° C. to 25° C. inclusive, for example.

The period of time for the preliminary stirring is appropriately set depending on the volume of the dispersion, the characteristics thereof, such as viscosity, the content of the catalyst support powder in the dispersion, and other conditions, and is, in general, preferably from 30 minutes to 120 hours inclusive, more preferably from 4 to 120 hours inclusive, and even more preferably from 12 to 120 hours inclusive.

The preliminary stirring can be performed in various types of atmosphere. For example, the preliminary stirring can be performed in an oxygen-containing atmosphere such as air, or in an inert gas atmosphere such as argon or nitrogen. In view of preventing deactivation of the reductant for reducing the platinum compound and the transition metal compound, it is preferable that the dispersion be preliminarily stirred in an inert gas atmosphere.

After the preliminary stirring has been completed, the method proceeds to the supporting step, and specifically, the dispersion is heated. As is the case with the preliminary stirring, heating the dispersion can also be performed in various types of atmosphere. For example, the heating can be performed in an oxygen-containing atmosphere such as air, or in an inert gas atmosphere such as argon or nitrogen. In view of preventing deactivation of the reductant for reducing the platinum compound and the transition metal compound and minimizing the decrease in the activity of the catalyst to be supported on the support particles, it is preferable that the dispersion be heated in an inert gas atmosphere. In view of simplifying the operation, it is preferable that the preliminary stirring and the heating be performed in the same atmosphere.

In the supporting step, the heating temperature of the dispersion can be appropriately selected depending on the types of the components contained in the dispersion, the mixing ratio of the components, and other conditions, and is, in general, preferably at least 120° C. and less than 200° C., and more preferably from 120° C. to 175° C. inclusive. When the heating temperature is within the above-described range, the heating time is preferably from 3 to 120 hours inclusive, more preferably from 6 to 72 hours inclusive, and even more preferably from 12 to 48 hours inclusive.

By heating the dispersion, the platinum compound and the transition metal compound contained in the dispersion are pyrolyzed, and also, platinum and the transition metal are reduced to form an alloy together. The thus formed platinum alloy adheres to the surfaces of the support particles, and the electrode catalyst of interest is thus formed.

In the supporting step, the platinum alloy of platinum and the transition metal, which is the catalyst, is supported such that the amount of the catalyst supported is preferably from 0.1 to 50 mass % inclusive and more preferably from 1 to 30 mass % inclusive with respect to the mass of the electrode catalyst. The amount of the catalyst supported can be regulated by appropriately regulating the contents of the catalyst support powder comprising the metal oxide powder, the platinum compound, and the transition metal compound in the dispersion preparation step and controlling the heating temperature and the heating time, for example, in the supporting step.

Based on the results of studies conducted by the inventors of the present invention, it has been found that, in view of enhancing the catalytic performance, in particular, the kinetic current density of the electrode catalyst thus obtained, it is advantageous to heat the dispersion in a state in which a formic acid species is present in the dispersion in the supporting step. The reason why the catalytic performance of the electrode catalyst is highly enhanced by heating the dispersion containing formic acid is currently not necessarily clear. However, the inventors of the present invention consider that this may be because the reduction of the platinum compound and the transition metal compound contained in the dispersion is accelerated by the formic acid species to thereby allow the solid solution state of the platinum alloy to be even more uniform.

Examples of the formic acid species include formic acid (HCOOH), a formate ($(HCOO)_n X$, wherein X represents an anion, and n represents the valence of X), and a formic acid ion ($HCOO^-$). These formic acid species may be used singly or in a combination of two or more. The total concentration of the formic acid species present in the dispersion during heating is set to be preferably from $1\times10^{-5}$ to 1 mol/L inclusive, more preferably from $1\times10^{-4}$ to $1\times10^{-1}$ mol/L inclusive, and even more preferably from $1\times10^{-3}$ to $1\times10^{-1}$ mol/L inclusive, with respect to the volume of the solvent in the dispersion. When the formic acid species is present in the dispersion in such a concentration, the catalytic performance, such as the kinetic current density, of the electrode catalyst to be produced is highly enhanced.

The total concentration of the formic acid species present in the dispersion during heating can be measured using liquid chromatography, for example.

An example of the method for allowing a formic acid species to be present in the dispersion during heating is adding a predetermined amount of formic acid species to the dispersion (hereinafter referred to as the method (a)). Another method thereof involves using, an organic compound having a formamide group as the solvent and also adding water or a water-containing compound to the solvent in the dispersion preparation step to thereby allow water to be present in the prepared dispersion (hereinafter referred to as the method (b)). According to the method (b), when heating the dispersion containing water or the water-containing compound, the solvent (i) containing the organic compound having a formamide group in the dispersion reacts with water to form a formic acid species (e.g., formic acid).

When the method (b) is employed, the amount of formic acid present in the dispersion gradually increases during the heating process in the supporting step, compared with a case where the method (a) is employed, and therefore, it is more likely that the alloying of platinum with the transition metal proceeds slowly. This brings the advantage that platinum atoms and transition metal atoms are alloyed more uniformly, and that a catalyst including support particles and fine particles of the platinum alloy uniformly distributed and supported thereon can be produced.

In the case where the method (b) is employed, the water-containing compound may be a compound that enables water to be present in the dispersion as a result of the preparation of the dispersion. With respect to such a compound, it is simple and easy to use a transition metal compound having water of crystallization as the transition metal compound (iv), which is contained in the dispersion, because such a compound serves as both the transition metal compound and the water-containing compound. When preparing the dispersion using a transition metal compound having water of crystallization, the water of crystallization is eluted into the dispersion, so that water will be present in the dispersion. This water reacts with the organic compound having a formamide group as the solvent (i) upon heating of the dispersion. As a result of this reaction, a formic acid species is generated in the dispersion.

In the case where the method (b) is employed, a transition metal compound having water of crystallization is more advantageous than water, because the transition metal compound having water of crystallization even more accelerates the alloying of platinum with the transition metal to produce an electrode catalyst in which the platinum atoms and the transition metal atoms are alloyed even more uniformly.

Without wishing to be bound by theory, the inventors of the present invention consider that the reason for this is as follows: when a transition metal compound having water of crystallization is added, water is likely to be coordinated around transition metal ions, and therefore formic acid generated during the supporting step is also likely to be arranged around the transition metal ions; and thus, the reductant will be present in a larger amount around ions of the transition metal, which is an element less likely to be reduced than platinum, so that the alloying of platinum with the transition metal is even more accelerated.

In the case where the method (b) is employed, the amount of water or the water-containing compound added is preferably set such that the amount of water in the dispersion is preferably from $1\times10^{-3}$ to 10 mol/L inclusive, more preferably from $1\times10^{-2}$ to 5 mol/L inclusive, and even more preferably from $1\times10^{-2}$ to $5\times10^{-1}$ mol/L inclusive, with respect to the volume of the solvent in the dispersion. When the amount of water or the water-containing compound added is set as described above, the formic acid species are allowed to be present in the dispersion at a desired concentration.

After the catalyst has been supported on the support particles in the supporting step (B), the solid-liquid separation step (C) is then performed. In this step, the electrode catalyst, which is the dispersoid, is separated from the dispersion after the supporting step. The electrode catalyst, which is a catalyst powder in which the platinum alloy of platinum and the transition metal is supported on the catalyst support powder, is obtained by performing this step. In the solid-liquid separation step, various types of known solid-liquid separation means can be used without limitation. Examples thereof include filtration using a filter, centrifugation, and decantation.

After the electrode catalyst has been thus separated, the heat treatment step (D) is performed. In the present production method, it is preferable to perform leaching prior to the heat treatment step to thereby remove minor impurities that are present on the surfaces of the platinum alloy particles. The catalytic activity of the electrode catalyst is highly enhanced by performing this leaching operation. In general, leaching is achieved by treating the electrode catalyst with an acid. Generally, the minor impurities that are present on the surfaces of the platinum alloy particles is eluted and removed by performing the acid treatment. Examples of the acid used in the leaching include perchloric acid, nitric acid, sulfuric acid, hydrochloric acid, and hydrogen peroxide. The concentration of the acid is preferably from 0.01 to 10 mol/L inclusive and more preferably from 0.1 to 1 mol/L inclusive.

The leaching can be performed while heating the dispersion, or can be performed in an unheated condition. In the case where the leaching is performed while heating, the dispersion can be heated preferably at a temperature from 30° C. to 100° C. inclusive. The leaching in an unheated condition can be performed at a temperature from 15° C. to 25° C. inclusive, for example. The leaching time can be set within a range from 0.1 to 100 hours inclusive, when the leaching is performed while heating, for example.

The electrode catalyst after the leaching is subjected to the heat treatment step (D) to thereby highly enhance the catalytic performance. For example, the heat treatment can be performed under vacuum or in a reducing gas atmosphere. By subjecting the electrode catalyst to the heat treatment, the alloyed state of the surfaces of the platinum alloy particles of platinum and the transition metal changes, to thereby further enhance the catalytic activity of the platinum alloy.

The reason why the catalytic performance of the electrode catalyst is enhanced by subjecting the electrode catalyst to the heat treatment step (D) as described above is currently not necessarily clear. However, the inventors of the present invention consider that this may be because the heat treatment step causes platinum to move to the surfaces of the platinum alloy particles to thereby form a layer in which platinum is concentrated (platinum-concentrated layer).

In the case where the heat treatment of the electrode catalyst is performed under vacuum, the degree of vacuum in the system is preferably set to be 10 Pa or less and more preferably set to be $1\times10^{-3}$ Pa or less, in terms of absolute pressure. In the case where the heat treatment of the electrode catalyst is performed in a reducing gas atmosphere, it is preferable to perform the heating while a reducing gas is circulated in the system. Examples of the reducing gas include a hydrogen gas, a carbon monoxide gas, and a mixture of these gases.

In the case where the electrode catalyst is heated under vacuum, the heating temperature is preferably set to be equal to or higher than the heating temperature in the above-described supporting step (B), because this highly improves the catalytic activity of the platinum alloy. In particular, the heating temperature in this step is preferably set to be from 60° C. to 400° C. inclusive and more preferably from 60° C. to 200° C. inclusive. The heating temperature in this step is even more preferably set to be a temperature that is within the above-described range and also equal to or higher than the heating temperature in the supporting step (B). In the case where the electrode catalyst is heated in a reducing gas atmosphere, the heating temperature is preferably set to be less than 200° C. and more preferably at least 60° C. and less than 200° C. In all of these cases, the heating time is preferably set to be from 0.1 to 20 hours inclusive and more preferably from 0.5 to 10 hours inclusive.

According to the above-described method, an electrode catalyst that has excellent catalytic performance such as kinetic current density can be easily produced.

In a case where a tin oxide, for example, is used as the support, an electrode catalyst obtained according to the above-described method (hereinafter referred to as the "electrode catalyst of the present invention") has a structure in which particles of a platinum alloy of platinum and a transition metal are supported on the tin oxide support. With regard to the form of the electrode catalyst, for example, the electrode catalyst may be in powder form.

The platinum alloy particles in the electrode catalyst of the present invention each have a surface region and a central region that is located closer to the center of the particle than the surface region. As described above, the proportion of platinum in the surface region is higher than the proportion of platinum in the central region.

The surface region includes the surface of a platinum alloy particle and its neighbouring subregion. When a platinum alloy particle is regarded as a sphere having the radius "r", the surface region refers to a region extending between a position apart from the center of the sphere by a distance of 0.8r to a position apart from the center of the sphere by a distance of r. The central region includes the center of a platinum alloy particle and its neighbouring subregion. When a platinum alloy particle is regarded as a sphere having the radius "r", the central region refers to a region extending between a position apart from the center of the sphere by a distance of 0 (i.e., the center itself) and a position apart from the center of the sphere by a distance of 0.3r.

For a platinum alloy particle, the phrase "the proportion of platinum in the surface region is higher than the proportion of platinum in the central region" means that an average value of the atomic proportion of platinum in the surface region is higher than an average value of the atomic proportion of platinum in the central region.

The "proportion of platinum" means the ratio of the number of platinum atoms to the total number of atoms of platinum and the transition metal, that is, "proportion of platinum=number of platinum atoms/(number of platinum atoms+number of transition metal atoms)×100", and is expressed in at % (atomic percent).

The proportion of platinum can be determined by performing line analysis using energy dispersive X-ray spectrometry with a scanning transmission electron microscope (STEM-EDS). In this line analysis, the average value of the atomic proportion of platinum in the surface region is obtained by averaging the values of the atomic proportion of platinum at all the measuring points that are located between a position apart from the center by a distance of 0.8r and a position apart from the center by a distance of r, the measuring points being set depending on the resolution of STEM-EDS. When a line to be analyzed traverses a particle, the surface region appears on opposite end portions of that line. In that case, on each of the opposite two end portions, the proportion of platinum is measured at regular intervals as described above, and an average of all the found values is calculated. The average value of the atomic proportion of platinum in the central region is obtained by averaging the values of the atomic proportion of platinum at all the measuring points that are located between a position apart from the center by a distance of 0 and a position apart from the center by a distance of 0.3×r, the measuring points being set depending on the resolution of STEM-EDS. It is sufficient that line analysis along at least one line in any single platinum alloy particle of the electrode catalyst indicates that the proportion of platinum in the surface region is higher than that in the central region. In the case where line analysis along at least one line indicates so, it can be said that the proportion of platinum in the surface region is higher than that in the central region, even if line analysis along another line indicates that the proportion of platinum in the surface region is equal to or lower than the proportion of platinum in the central region.

Each of the platinum alloy particles of the electrode catalyst of the present invention has a platinum-concentrated layer in its surface region. When a platinum alloy particle is regarded as a sphere having the radius "r", the platinum-concentrated layer refers to a region with the proportion of platinum being 90 at % or more extending continuously for a length of 0.1r or more. The platinum-concentrated layer may have a substantially spherical shell-like shape, for example. Alternatively, the platinum-concentrated layer may be discontinuously present in the surface region. In view of enhancing the catalytic performance of the electrode catalyst, it is preferable that the platinum-concentrated layer having a substantially spherical shell-like shape be present in the surface region.

Whether or not a platinum alloy particle has a platinum-concentrated layer in its surface region can be confirmed in the following manner through line analysis using STEM-EDS.

In line analysis using STEM-EDS, the platinum alloy particle is first subjected to mapping analysis using STEM-EDS, and profile data on any line that passes through approximately the center of the platinum alloy particle are extracted and analyzed from the obtained EDS mapping data. Next, the platinum alloy particle is regarded as a sphere whose diameter is equal to the analysis length of the line analysis, and the presence or absence of a platinum-concentrated layer is confirmed by confirming the presence or absence of a region with the proportion of platinum being 90 at % or more extending continuously for a length of 0.1r or more, where "r" is the radius of the sphere, in the surface region (region extending between a position apart from the center of the sphere by a distance of 0.8r and a position apart from the center of the sphere by a distance of r) along the direction of the line analysis.

Moreover, the electrode catalyst of the present invention has a degree of metallization of Sn of 5% or less, preferably 3% or less, in an analysis region including the surface of the electrode catalyst and its neighbouring subregion, as measured through X-ray photoelectron spectroscopy (XPS), the degree of metallization being defined by the equation (1) below:

$$\text{Degree of metallization of Sn (\%)} = R_{Sn\text{-}metal} / (R_{Sn\text{-}metal} + R_{Sn\text{-}oxide}) \times 100 \qquad (1)$$

where, $R_{Sn\text{-}metal}$ represents the area assigned to metallic Sn in a spectrum derived from the Sn $3d_{5/2}$ orbital obtained by X-ray photoelectron spectroscopy, and $R_{Sn\text{-}oxide}$ represents the area assigned to an Sn oxide in the spectrum derived from the Sn $3d_{5/2}$ orbital obtained by X-ray photoelectron spectroscopy.

The "analysis region including the surface and its neighbouring subregion" as used herein refers to a region to be analyzed that extends for a specific distance in a depth direction of the electrode catalyst when the electrode catalyst is subjected to analysis using X-ray photoelectron spectroscopy. In general, the region that can be analyzed in terms of the depth using XPS, that is, the analysis region including the surface and its neighbouring subregion is a region extending from a depth of 0 nm to a depth of 5 nm from the surface. Specifically, the degree of metallization (%) of tin is obtained as the ratio of the area of a spectrum derived from metallic Sn to the area of the entire spectrum of Sn $3d_{5/2}$.

In the present invention, analysis using XPS is preferably performed under the following conditions (A1) to (A5).
(A1) X-ray source: Al Kα (hv=1486.6 eV);
(A2) Angle between sample and detector: θ=45°;
(A3) Calibration of detector: performed using Cu2p and Au4f;
(A4) Analysis region: a 0.1-mm diameter circle; and
(A5) Chamber pressure during analysis: on the order of $10^{-7}$ to $10^{-6}$ Pa.

In a diffraction pattern obtained by X-ray diffractometry on the electrode catalyst of the present invention, a peak assigned to the (200) plane of the platinum alloy is at a diffraction angle 2θ of 46.5° to 48.0° inclusive. Since the electrode catalyst has the structure in which the particles of the platinum alloy (Pt-M (wherein M represents a transition metal)) are supported on the support, the diffraction angle 2θ of the peak assigned to the (200) plane of the platinum alloy varies from 46.2°, which is of platinum alone, to a higher angle in a diffraction pattern obtained by X-ray diffractometry on the electrode catalyst. Specifically, the diffraction angle 2θ of the peak assigned to the platinum alloy in the diffraction pattern is 46.5° or more, which leads to the improving effect on the catalytic activity by alloying. The diffraction angle 2θ of the peak assigned to the platinum alloy is 48.0° or less. The diffraction angle 2θ higher than 48.0° means that dissolving of the transition metal in Pt has proceeded excessively (when the transition metal is Ni, the molar concentration of Ni in the platinum alloy would exceed 50%), resulting in the lower catalytic activity. Therefore, when a diffraction angle 2θ is 48.0° or less, a high degree of catalytic activity is maintained advantageously. In view of these points, the diffraction angle 2θ of the peak assigned to the platinum alloy is from 46.5° to 48.0° inclusive and more preferably from 46.8° to 47.7° inclusive. In order to regulate the diffraction angle 2θ of the peak assigned to the platinum alloy within the aforementioned range, the heating temperature can be controlled in the supporting step of the above-described method for producing an electrode catalyst and also the amounts of the platinum compound and the transition metal compound added can be adjusted. The reason why the extent of the shift of the peak assigned to the (200) plane is focused is that, if so, overlapping with the diffraction peak caused by the tin oxide, which is the support, can be avoided to easily perform the analysis.

In view of increasing the catalytic activity, the molar ratio of platinum (Pt) to the transition metal (M), Pt/M, in the electrode catalyst of the present invention is preferably 1 or more. In view of increasing the catalytic activity by increasing the degree of alloying of platinum, the molar ratio Pt/M is preferably 10 or less. In view of these, the molar ratio Pt/M is preferably from 1 to 10 inclusive and more preferably from 1 to 7 inclusive. In view of increasing the catalytic activity, the catalyst is supported such that the total amount supported of the platinum alloy of platinum and the transition metal, which is the catalyst, is preferably from 0.1 to 50 mass % inclusive and more preferably from 1 to 30 mass % inclusive with respect to the mass of the electrode catalyst. The adjustment of the amount of the catalyst supported can be achieved by suitably adjusting the contents of the catalyst support powder comprising a metal oxide powder, the platinum compound, and the transition metal compound in the dispersion preparation step of the above-described production method and also controlling, for example, the heating temperature and the heating time in the supporting step. The amounts of platinum and the transition metal supported can be determined by dissolving the electrode catalyst appropriately to form a solution, and analyzing this solution through ICP mass spectrometry. The amount supported of the platinum alloy of platinum and the transition metal can be obtained as the sum of the amount of platinum supported and the amount of the transition metal supported.

It is advantageous that the platinum alloy particles in the form of fine particles be supported on the support. For example, the particle size of the platinum alloy particles is preferably from 1 to 20 nm inclusive, more preferably from 1 to 10 nm inclusive, and even more preferably from 1 to 5 nm inclusive. When platinum alloy particles having a particle size within such a range is supported, the following advantages are provided: elution of the platinum alloy particles during the progress of the electrode reaction can be effectively prevented, and a decrease in the specific surface area of the platinum alloy particles can also be effectively prevented. The particle size of the platinum alloy particles can be obtained as the average value of the particle size of the platinum alloy that is measured in an electron microscope image or through small angle X-ray scattering.

Depending on the amount of the platinum alloy particles supported, the entire surface of the support may be uniformly covered with the platinum alloy particles, or may be covered with the platinum alloy particles such that the surface of the support is partially exposed. For example, in the latter case, only a single portion of the surface may be covered; however, the surface of the support is preferably covered discontinuously with the platinum alloy particles such that an appropriate distance is maintained between the platinum alloy particles to expose the surface of the support partially. The reason for this is as follows: if the reaction area of the alloy catalyst is excessively large relative to the amount of diffusing oxygen in an oxygen reduction reaction, the diffusion of oxygen becomes rate-limiting, and this may inhibit the intrinsic catalytic activity from being sufficiently exhibited.

The electrode catalyst obtained according to the production method of the present invention can be contained in at least one of an oxygen electrode and a fuel electrode of a membrane electrode assembly in which the oxygen electrode and the fuel electrode are respectively disposed on one side and the other side of a solid polymer electrolyte membrane. Preferably, the electrode catalyst can be contained in both the oxygen electrode and the fuel electrode.

Particularly preferably, the oxygen electrode and the fuel electrode each include a catalyst layer containing the electrode catalyst obtained according to the production method of the present invention, and a gas diffusion layer. In view of the smooth electrode reaction, the electrode catalyst is preferably in contact with the solid polymer electrolyte membrane. The gas diffusion layer functions as a collector that has a current-collecting function and also as a support. Furthermore, the gas diffusion layer has a sufficient gas supplying function to the electrode catalyst. As the gas diffusion layer, gas diffusion layers that have conventionally been used in this type of technical field can be used. For example, carbon paper and carbon cloth, which are porous materials, can be used. Specifically, the gas diffusion layer can be formed of, for example, a piece of carbon cloth woven from a thread made of polytetrafluoroethylene-coated carbon fibers and carbon fibers without such coating mixed in a predetermined ratio.

The solid polymer electrolyte may be any electrolyte that have conventionally been used in this type of technical field. Examples thereof include proton conducting membranes based on a perfluorosulfonic acid polymer; electrolytes obtained by doping a hydrocarbon-based polymer with an inorganic acid such as phosphoric acid; organic/inorganic hybrid polymers partially substituted with a proton conducting functional group; and proton conductors obtained by impregnating a polymer matrix with a phosphoric acid solution or a sulfuric acid solution.

A separator is disposed on each side of the above-described membrane electrode assembly, and thus, a solid polymer electrolyte fuel cell is obtained. For example, the separator may be a separator having a plurality of protruding portions (ribs) extending in one direction and formed at predetermined intervals on its side that is to face to the gas diffusion layer. Grooves having a rectangular cross-sectional shape are formed between adjacent protruding portions. The grooves are used as flow channels for supplying and discharging a fuel gas and an oxidant gas such as air. The fuel gas and the oxidant gas are supplied from a fuel gas supply means and an oxidant gas supply means, respectively. The separators on the respective sides of the membrane electrode assembly are disposed preferably such that the grooves formed in one of the separators are arranged orthogonally to the grooves formed in the other separator. The above-described configuration is the minimum unit of a fuel cell, and a fuel cell can include a cell stack of several tens to several hundreds of said configurations arranged in parallel.

Although the present invention has been described above by way of preferred embodiments thereof, the present invention is not limited to the foregoing embodiments. In the foregoing, an exemplary embodiment in which an electrode catalyst produced according to the method of the present invention is used as an electrode catalyst of a solid polymer electrolyte fuel cell has been mainly described; however, an electrode catalyst produced according to the method of the present invention can be used as an electrode catalyst in various types of fuel cells other than a solid polymer electrolyte fuel cell, such as an alkaline fuel cell, a phosphoric acid fuel cell, and a direct methanol fuel cell, for example.

EXAMPLES

Hereinafter, the present invention will be described in greater detail by way of examples. However, the scope of the present invention is not limited to the following examples. In the following description, "%" means "mass %" unless otherwise specified.

Example 1

(1) Support Production Step

Tungsten/fluorine-containing tin oxide particles having a primary particle size of 20 nm was obtained based on Example 1 disclosed in WO 2016/098399.

(2) Dispersion Preparation Step

To a 500-mL volumetric flask were added 337 mL of N,N-dimethylformamide (abbreviated to DMF, 049-32363, manufactured by Wako Pure Chemical Industries, Ltd.), bis(acetylacetonato)platinum(II) ($Pt(acac)_2$, 028-16853, manufactured by Wako Pure Chemical Industries, Ltd.) in a concentration of $9.87 \times 10^{-3}$ $mol/L_{-DMF}$, bis(2,4-pentanedionato)nickel(II) ($Ni(acac)_2$, 283657-25G, manufactured by Sigma-Aldrich) in a concentration of $7.40 \times 10^{-3}$ $mol/L_{-DMF}$, and benzoic acid (204-00985, manufactured by Wako Pure Chemical Industries, Ltd.) in a concentration of $2.49 \times 10^{-1}$ $mol/L_{-DMF}$, and the support obtained in (1) was also added thereto in a concentration of 10 $g/L_{-DMF}$. The resulting liquid containing these components was subjected to a treatment using an ultrasonic disperser at room temperature (25° C.) for 30 minutes, to obtain a dispersion. Note that the above-described concentrations in "$mol/L_{-DMF}$" or "$g/L_{-DMF}$" mean an amount per unit volume of DMF, which is the solvent of the dispersion.

(3) Supporting Step

The volumetric flask containing the dispersion was submerged in an oil at room temperature while the volumetric flask was kept purged with argon gas, and the dispersion was heated to 120° C. at a temperature increasing rate of the oil of 5° C./minute. The dispersion was heated under reflux for 48 hours while the oil temperature in the oil bath was kept at 120° C. After that, the oil bath was removed, and the dispersion was cooled to room temperature, followed by filtration. Next, the residue on the filter was washed with a mixed solvent of acetone and ethanol (in a volume ratio of 1:1) five times, and then with a mixed solvent of water and ethanol (in a volume ratio of 1:1) once, followed by drying. The thus obtained dry powder was dispersed in 400 mL of 0.5 mol/L perchloric acid, and the resultant was stirred under heating at 60° C. for 2 hours for leaching.

(4) Solid-Liquid Separation Step

The dispersion after leaching was filtered, and subsequently the residue on the filter was washed and dried, to thereby obtain an electrode catalyst including a platinum-nickel alloy supported.

(5) Heat Treatment Step

The dry powder obtained through solid-liquid separation was heat-treated under vacuum at 180° C. for 2 hours using a quartz tubular furnace to which a rotary pump was connected. Thus, an electrode catalyst including a platinum-nickel alloy supported was obtained.

Table 1 below shows the percentage of metallic Sn in a spectrum derived from the Sn $3d_{5/2}$ orbital obtained by XPS; the amount of Pt supported (mass %), the amount of Ni supported (mass %), and the molar ratio between Pt and Ni (Pt/Ni) measured by an ICP mass spectrometer (ICP-MS); the diffraction angle $2\theta(°)$ of the peak assigned to the (200) plane of the platinum alloy in a diffraction pattern obtained through powder X-ray diffractometry (XRD); the presence or absence of a platinum-concentrated layer determined on the basis of the results of line analysis conducted using an STEM image and the results of EDS mapping; and the kinetic current density $j_k$ (mA/cm$^2_{-Pt}$) at 0.64 V (VS. Ag/AgCl) determined through cyclic voltammetry (CV) and linear sweep voltammetry (LSV) using a rotating disk electrode (RDE). The amount of Pt supported is defined as the mass of Pt/(the mass of Pt+the mass of Ni+the mass of the support)×100; and the amount of Ni supported is defined as the mass of Ni/(the mass of Pt+the mass of Ni+the mass of the support)×100.

The XPS analysis was conducted using a Versa Probe II manufactured by ULVAC-PHI, Inc. under the following conditions: X-ray source: monochromatic Al Kα (hv=1486.6 eV); pass energy: 55.0 eV, Energy step: 0.1 eV; angle between sample and detector: 45°; and analysis region of sample: a 0.1-mm diameter circle. Multipak was used as analyzing software.

Charge correction was performed assuming that the position of the top of the main peak (binding energy of tin oxide) in the spectrum derived from the Sn $3d_{5/2}$ orbital was at 486.7 eV. The degree of metallization of Sn was determined by performing waveform separation of the spectrum derived from the Sn $3d_{5/2}$ orbital. A peak at which the binding energy was higher than 484.5 eV and lower than 485.2 eV was regarded as the peak indicating the metallic bonding state of the Sn element, and other peaks were regarded as the peaks indicating the oxide state of Sn. These peaks were isolated from each other, and the areas thereof were measured. The found values of the areas were incorporated into the equation (1) above to obtain the degree of metallization of Sn.

The XRD analysis was performed using a RINT-TTR III manufactured by Rigaku Corporation and using Cu Kα (0.15406 nm, 50 kV, 300 mA) as the X-ray source.

The line analysis through STEM-EDS was performed in the following manner. A scanning transmission electron microscope (JEM-ARM200F) manufactured by JEOL Ltd. was used for the STEM observation, EDS detectors (two Dry SD100GV Detectors) manufactured by JEOL Ltd. were used for the EDS, and an NSS4 manufactured by Thermo Fisher Scientific was used as analyzing software. The STEM observation and the EDS mapping were conducted under the conditions below. The line analysis was conducted by extracting profile data on any line passing through approximately the center of a platinum alloy particle from the acquired EDS mapping data, and analyzing the profile data using the aforementioned analyzing software.
Measurement Conditions Sampling: powder sample of electrode catalyst was dispersed onto Mo grid Acceleration voltage: 200 kV (for both STEM observation and EDS)

Observation magnification: 3,000,000×

Probe size: 0.2 nm

Pixel counts of mapping image: 256×256

Peak species of elements used for analysis:

Pt Lα: 9.441 keV

Ni Kα: 7.771 keV

Quantitation method: Cliff-Lorimer method (thin-film approximation method)

Example 2

An electrode catalyst including a platinum-nickel alloy supported was obtained in the same manner as in Example 1, except that the concentrations of the support particles, Pt(acac)$_2$, Ni(acac)$_2$, and benzoic acid in DMF in the dispersion preparation step (2) as well as the oil temperature and the holding time for heating under refluxing in the supporting step (3) were changed as shown in Table 1. The properties of the electrode catalyst obtained are shown in Table 1.

Example 3

An electrode catalyst including a platinum-nickel alloy supported was obtained in the same manner as in Example 1, except that the oil temperature and the holding time in the supporting step (3) were changed as shown in Table 1. The properties of the electrode catalyst obtained are shown in Table 1.

Example 4

The support production step (1) and the heat treatment step (5) were performed in the same manner as in Example 1. The dispersion preparation step (2) and the supporting step (3) in Example 1 were changed as follows.

To a 500-mL volumetric flask were added 337 mL of N,N-dimethylformamide (abbreviated to DMF, 049-32363, manufactured by Wako Pure Chemical Industries, Ltd.), bis(acetylacetonato)platinum(II) (Pt(acac)$_2$, 028-16853, manufactured by Wako Pure Chemical Industries, Ltd.) in a concentration of $1.22\times10^{-2}$ mol/L$_{-DMF}$, bis(2,4-pentanedionato)nickel(II).dihydrate (Ni(acac)$_2$.2H$_2$O, 343-01981, manufactured by Dojindo Laboratories) in a concentration of $9.37\times10^{-3}$ mol/L$_{-DMF}$, benzoic acid (204-00985, manufactured by Wako Pure Chemical Industries, Ltd.) in a concentration of $2.99\times10^{-1}$ mol/L$_{-DMF}$, and the support obtained in (1) in a concentration of 16 g/L$_{-DMF}$, and the resultant liquid was subjected to a dispersing treatment using an ultrasonic disperser at room temperature for 30 minutes. Subsequently, while the volumetric flask containing the dispersion thus prepared was purged with argon gas, the dispersion was subjected to preliminary stirring at 400 rpm at room temperature for 20 hours using a football-shaped stirrer with a major diameter of about 2 cm and a minor diameter of about 1 cm. The volumetric flask containing the dispersion was submerged in an oil bath in which the oil temperature was controlled to be 160° C. while the volumetric flask was kept purged with argon gas, and temperature increase was started. At this time, the time taken to boil the solvent in the volumetric flask was about 7 minutes. After the solvent boiled, the dispersion was heated under refluxing for 12 hours while the oil temperature in the oil bath was kept at 160° C. After that, the leaching, the solid-liquid separation step (4), and the heat treatment step (5) were performed in the same manner as in Example 1, and thus, an electrode catalyst including a platinum-nickel alloy supported was obtained. The properties of the electrode catalyst obtained are shown in Table 1.

Examples 5 to 7

Electrode catalysts including a platinum-nickel alloy supported were obtained in the same manner as in Example 4, except that the heating temperature in the heat treatment step (5) in Example 4 was changed as shown in Table 1. The properties of the electrode catalysts obtained are shown in Table 1.

Example 8

The conditions of the heat treatment step (5) in Example 3 were changed so that a reducing heat treatment step was performed in a gas mixture atmosphere of hydrogen and nitrogen (4 vol % hydrogen; balance nitrogen) at 80° C. for 2 hours. Otherwise, the same procedure as in Example 3 was performed, and thus, an electrode catalyst including a platinum-nickel alloy supported was obtained. The properties of the electrode catalysts obtained are shown in Table 1.

Comparative Examples 1 to 4

Electrode catalysts including a platinum-nickel alloy supported were obtained in the same manner as in Examples 1 to 4, except that the heat treatment step (5) in Examples 1 to 4 was not performed, respectively. The properties of the electrode catalysts obtained are shown in Table 2.

Comparative Example 5

The conditions of the heat treatment step (5) in Example 4 were changed so that a heat treatment step was performed in a nitrogen gas atmosphere at 180° C. for 2 hours. Otherwise, the same procedure as in Example 4 was performed, and thus, an electrode catalyst including a platinum-nickel alloy supported was obtained. The properties of the electrode catalysts obtained are shown in Table 2.

Comparative Example 6

In this comparative example, a catalyst including a platinum-nickel alloy supported was produced using a colloidal method according to the disclosure in Patent Literature 1.
(1) Support Production Step
The same procedure as in Example 1 was performed.
(2) Supporting Step
First, 5 ml of an $H_2PtCl_6$ solution (corresponding to 1 g of Pt) and 295 mL of distilled water were mixed. Platinum in the mixture was reduced with 15.3 g of $NaHSO_3$ and then the resulting mixture was diluted with 1400 mL of distilled water. Subsequently, 35% hydrogen peroxide (120 mL) was added dropwise thereto while adjusting the pH of the mixture to approximately 5 by adding a 5% aqueous NaOH solution, to thereby obtain a solution containing a platinum colloid. At this time, the 5% aqueous NaOH solution was added as appropriate to maintain the pH of the solution at approximately 5. The colloid-containing solution thus obtained contained 1 g of platinum. To this solution was added nickel nitrite.hexahydrate $(Ni(NO_3)_2 \cdot 6H_2O)$. The amount added was 1.49 g so that the molar ratio between Pt and Ni, Pt/Ni, was 1. After that, 8.7 g of the support obtained in the step (1) was added, followed by mixing at 90° C. for 3 hours. The resultant solution was cooled and then subjected to solid-liquid separation. In order to remove chloride ions from the wet powder obtained through the solid-liquid separation, the powder was again diluted with 1500 mL of distilled water, and the resultant solution was boiled at 90° C. for 1 hour and cooled, followed by solid-liquid separation. Such washing operation was performed four times. Finally, after the solid-liquid separation, the powder obtained was dried in the atmosphere at 60° C. for 12 hours. In this manner, platinum with a non-stoichiometric oxide thereof and nickel with a non-stoichiometric oxide thereof were supported on the support. This support was heat-treated in a nitrogen-diluted hydrogen atmosphere (4 vol % hydrogen) at 200° C. for 2 hours, to thereby obtain an electrode catalyst including a platinum-nickel alloy supported on the support. The properties of the electrode catalysts obtained are shown in Table 3.

Comparative Example 7

The same heat treatment step (5) as in Example 1 was performed on the electrode catalyst obtained in Comparative Example 6. The properties of the electrode catalysts obtained are shown in Table 3.
Evaluation
On the electrode catalysts obtained in Examples and Comparative Examples, cyclic voltammetry (CV) and linear sweep voltammetry (LSV) were performed using a rotating disk electrode. Specifically, "preparation of electrode", "CV measurement", and "evaluation of ORR activity" described below were performed in this order.
Preparation of Electrode
A glassy carbon (GC) disk electrode with a diameter of 5 mm was polished using a 0.05 μm alumina paste, followed by ultrasonic cleaning using pure water. An electrode catalyst sample was added to a 90 vol % aqueous ethanol solution and dispersed therein using an ultrasonic homogenizer. The resultant was applied to the GC disk to a density such that the amount of Pt per unit area of the disk was 12 $\mu g_{Pt}/cm^2_{-Gc}$, and then dried at normal temperature. After the drying, a 5% Nafion (registered trademark) solution (274704-100ML, manufactured by Sigma-Aldrich) was dripped onto the catalyst on the GC disk so as to provide a film thickness of 50 nm, and then dried at normal temperature.
Cyclic Voltammetry (CV)
CV was performed using an electrochemical measurement system HZ-7000 manufactured by Hokuto Denko Corporation. A 0.1 mol/L aqueous $HClO_4$ solution was purged with $N_2$ for 1 hour or longer, and then cleaning was performed 300 times using a silver-silver chloride electrode (Ag/AgCl) as a reference electrode, over a potential range of −0.25 to 0.742 V (VS. Ag/AgCl) at a sweep rate of 0.5 V/s. After that, CV was performed over a potential range of −0.25 to 0.74 V as the actual measurement. The electrochemical surface area (ECSA) was analyzed using hydrogen adsorption waves observed at or below 0.4 V.
Evaluation of ORR Activity
The electrolytic solution (aqueous $HClO_4$ solution) used in the CV was purged with an oxygen gas for 1 hour or longer, and then LSV was performed. Data was acquired at a temperature of 25° C. over a potential range of −0.20 to 1.00 V (VS. Ag/AgCl) at a sweep rate of 10 mV/s at six different numbers of revolutions between 400 rpm and 2500 rpm. The results were analyzed using a Koutecky-Levich plot, and the value of kinetic current density $j_k$ ($mA/cm^2$) at 0.64 V (VS. Ag/AgCl) was obtained.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Dispersion preparation step | Amount of support ($g/L_{-DMF}$) | 10 | 2 | 10 | 16 | Same as Example 4 | Same as Example 4 | Same as Example 4 | Same as Example 3 |
| | Type of Pt compound | Pt(acac)$_2$ | Pt(acac)$_2$ | Pt(acac)$_2$ | Pt(acac)$_2$ | | | | |
| | Type of Ni compound | Ni(acac)$_2$ | Ni(acac)$_2$ | Ni(acac)$_2$ | Ni(acac)$_2$·2H$_2$O | | | | |
| | Concentration ($mol/L_{-DMF}$) Pt compound | 9.87 × 10$^{-3}$ | 1.97 × 10$^{-3}$ | 9.87 × 10$^{-3}$ | 1.22 × 10$^{-2}$ | | | | |
| | Ni compound | 7.40 × 10$^{-3}$ | 1.48 × 10$^{-3}$ | 7.40 × 10$^{-3}$ | 9.37 × 10$^{-3}$ | | | | |
| | Benzoic acid | 2.49 × 10$^{-1}$ | 4.97 × 10$^{-2}$ | 2.49 × 10$^{-1}$ | 2.99 × 10$^{-1}$ | | | | |
| | Preliminary stirring | no | no | no | yes | | | | |

TABLE 1-continued

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Supporting step | Oil temperature (° C.) | 120 | 160 | 160 | 160 |  |  |  |  |
|  | Temperature increase rate (° C./min) | 5 | 5 | 5 | Approx. 20 |  |  |  |  |
|  | Holding time (h) | 48 | 12 | 12 | 12 |  |  |  |  |
| Heat treatment step |  | Vacuum 180° C., 2 h | Vacuum 180° C., 2 h | Vacuum 180° C., 2 h | Vacuum 180° C., 2 h | Vacuum 200° C., 2 h | Vacuum 160° C., 2 h | Vacuum 100° C., 2 h | $H_2$ 4% 80° C., 2 h |
| Evaluation | XRD2θ (deg.) | 47.381 | 46.847 | 47.017 | 47.391 | 47.374 | 47.462 | 47.501 | 47.261 |
|  | Degree of metallization of Sn (%)* | 3.5 | 3.0 | 3.3 | 2.0 | 1.8 | 1.9 | 1.8 | 1.9 |
|  | Amount of Pt supported (mass %) | 10.7 | 13.6 | 15.3 | 12.4 | 12.4 | 12.4 | 12.4 | 15.3 |
|  | Amount of Ni supported (mass %) | 1.54 | 1.29 | 1.49 | 1.54 | 1.54 | 1.54 | 1.54 | 1.49 |
|  | Pt/Ni molar ratio | 2.09 | 3.17 | 3.09 | 2.42 | 2.42 | 2.42 | 2.42 | 3.09 |
|  | Platinum-concentrated layer in surface region | yes | yes | yes | yes | yes | yes | yes | yes |
|  | $j_k$ (mA/cm$^2$)** | 0.83 | 0.78 | 0.73 | 0.80 | 0.84 | 0.70 | 0.77 | 0.68 |

*Amount of metallic Sn determined in Sn $3d_{5/2}$ spectrum obtained through XPS
**$j_k$: value at 0.64 V vs. Ag/AgCl

TABLE 2

|  |  | Com. Ex. 1 | Com. Ex. 2 | Com. Ex. 3 | Com. Ex. 4 | Com. Ex. 5 |
|---|---|---|---|---|---|---|
| Dispersion preparation step | Amount of support (g/L$_{-DMF}$) | Same as Example 1 | Same as Example 2 | Same as Example 3 | Same as Example 4 | Same as Example 4 |
|  | Type of Pt compound |  |  |  |  |  |
|  | Type of Ni compound |  |  |  |  |  |
|  | Concentration (mol/L$_{-DMF}$) Pt compound |  |  |  |  |  |
|  | Ni compound |  |  |  |  |  |
|  | Benzoic acid |  |  |  |  |  |
|  | Preliminary stirring |  |  |  |  |  |
| Supporting step | Oil temperature (° C.) |  |  |  |  |  |
|  | Temperature increase rate (° C./min) |  |  |  |  |  |
|  | Holding time (h) |  |  |  |  |  |
| Heat treatment step |  | no | no | no | no | Nitrogen 180° C., 2 h |
| Evaluation | XRD2θ (deg.) | 47.696 | 47.247 | 47.338 | 47.543 | 47.408 |
|  | Degree of metallization of Sn (%)* | 3.5 | 4.1 | 4.5 | 3.2 | 1.8 |
|  | Amount of Pt supported (mass %) | 10.7 | 13.6 | 15.3 | 12.4 | 12.4 |
|  | Amount of Ni supported (mass %) | 1.54 | 1.29 | 1.49 | 1.54 | 1.54 |
|  | Pt/Ni molar ratio | 2.09 | 3.17 | 3.09 | 2.42 | 2.42 |
|  | Platinum-concentrated layer in surface region | no | no | no | no | no |
|  | $j_k$ (mA/cm$^2$)** | 0.62 | 0.57 | 0.48 | 0.61 | 0.57 |

*Amount of metallic Sn determined in Sn $3d_{5/2}$ spectrum obtained through XPS
**$j_k$: value at 0.64 V vs. Ag/AgCl

TABLE 3

|  |  | Com. Ex. 6 | Com. Ex. 7 |
|---|---|---|---|
| Heat treatment step |  | no | Vacuum 180° C., 2 h |
| Evaluation | XRD2θ (deg.) | 47.405 | 47.395 |
|  | Degree of metallization of Sn (%)* | 16 | 16 |
|  | Amount of Pt supported (mass %) | 10 | 10 |
|  | Amount of Ni supported (mass %) | 3 | 3 |
|  | Pt/Ni molar ratio | 1 | 1 |
|  | Platinum-concentrated layer in surface region | no | no |
|  | $j_k$ (mA/cm$^2$)** | 0.44 | 0.47 |

*Amount of metallic Sn determined in Sn $3d_{5/2}$ spectrum obtained through XPS
**$j_k$: value at 0.64 V vs. Ag/AgCl From the results shown in Tables 1 and 2, it can be seen that the kinetic current density $j_k$ in each of Examples 1 to 4, in which vacuum heat treatment at 180° C. was performed as the heat treatment of the platinum-nickel alloy catalysts, is higher than those in Comparative Examples 1 to 4, in which vacuum heat treatment was not performed. Moreover, it can be seen from the results shown in Examples 4 to 7 that the effect of the vacuum heat treatment can be exhibited not only in the case where the heat treatment temperature is 180° C. Furthermore, from the results of Example 8, it can be seen that the heat treatment may be performed either under vacuum or in a reducing atmosphere. On the other hand, it can be seen from the results shown in Comparative Example 5 that, even when heat treatment is performed in a nitrogen atmosphere, the effect of increasing the kinetic current density $j_k$ cannot be exhibited.

It can be seen from the results shown in Table 3 that the kinetic current density $j_k$ in Comparative Example 7 is not much higher than that of Comparative Example 6. Thus, it can be seen that the heat treatment step according to the present invention is effective for a catalyst powder prepared through the supporting step according to the present invention.

It can be seen from the results shown in Tables 1 and 3 that the kinetic current density $j_k$ in each of Examples 1 to 8 is higher than those in Comparative Examples 6 and 7, in which the electrode catalysts were prepared using a conventional colloidal method.

Figure 7:
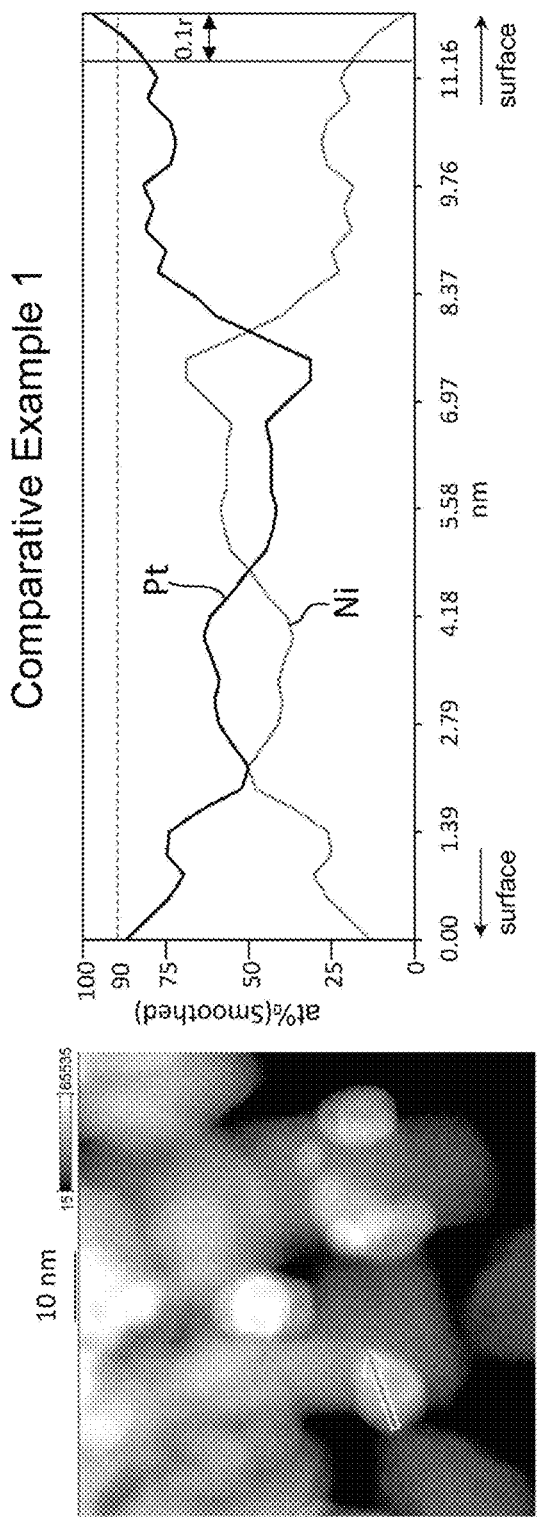
FIG. 7 shows the results of line analysis conducted using an STEM image and the results of EDS mapping, on a catalyst fine particle in the electrode catalyst obtained in Comparative Example 1.
Figure 8:
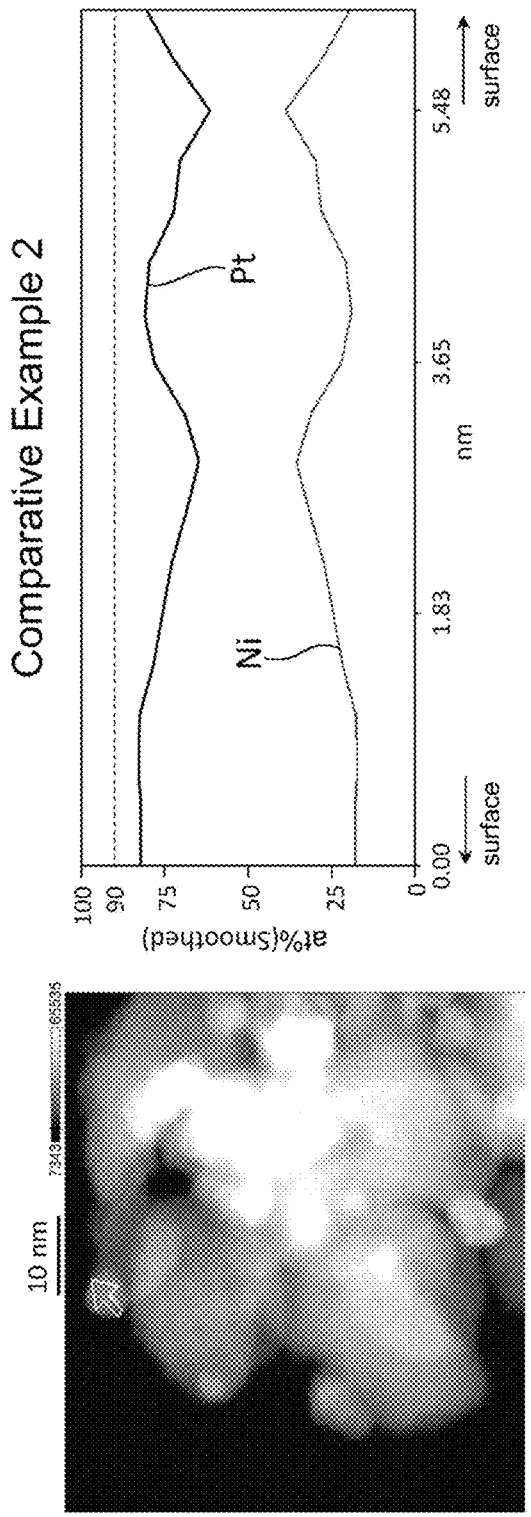
FIG. 8 shows the results of line analysis conducted using an STEM image and the results of EDS mapping, on a catalyst fine particle in the electrode catalyst obtained in Comparative Example 2.
Figure 9:
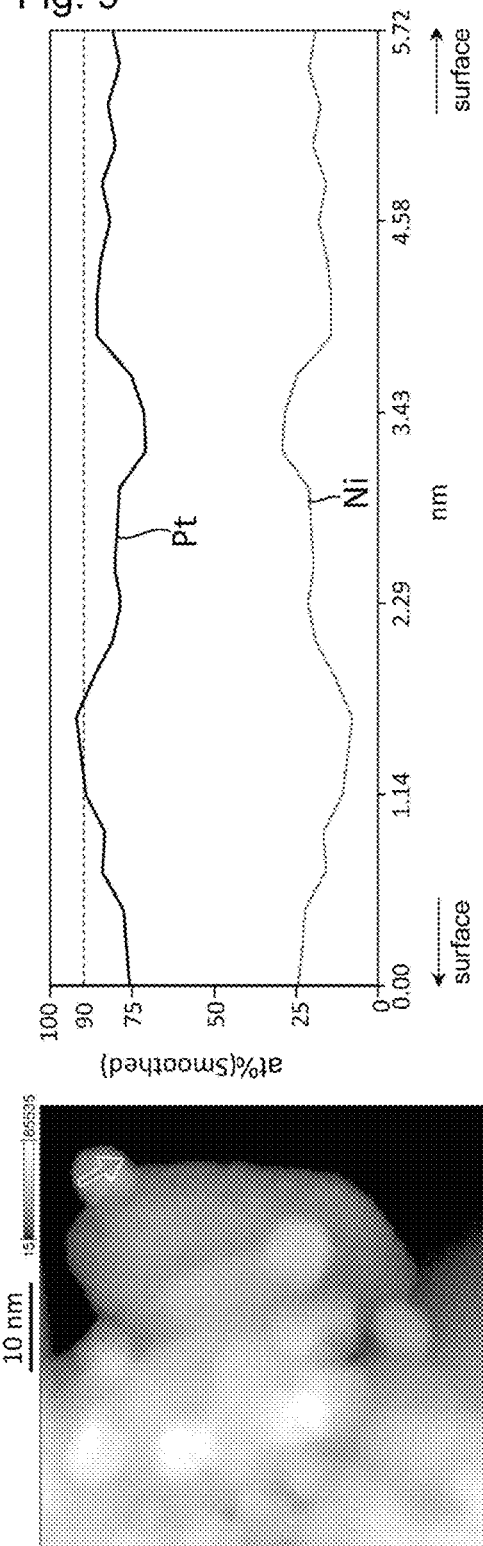
FIG. 9 shows the results of line analysis conducted using an STEM image and the results of EDS mapping, on a catalyst fine particle in the electrode catalyst obtained in Comparative Example 3.
Figure 10:
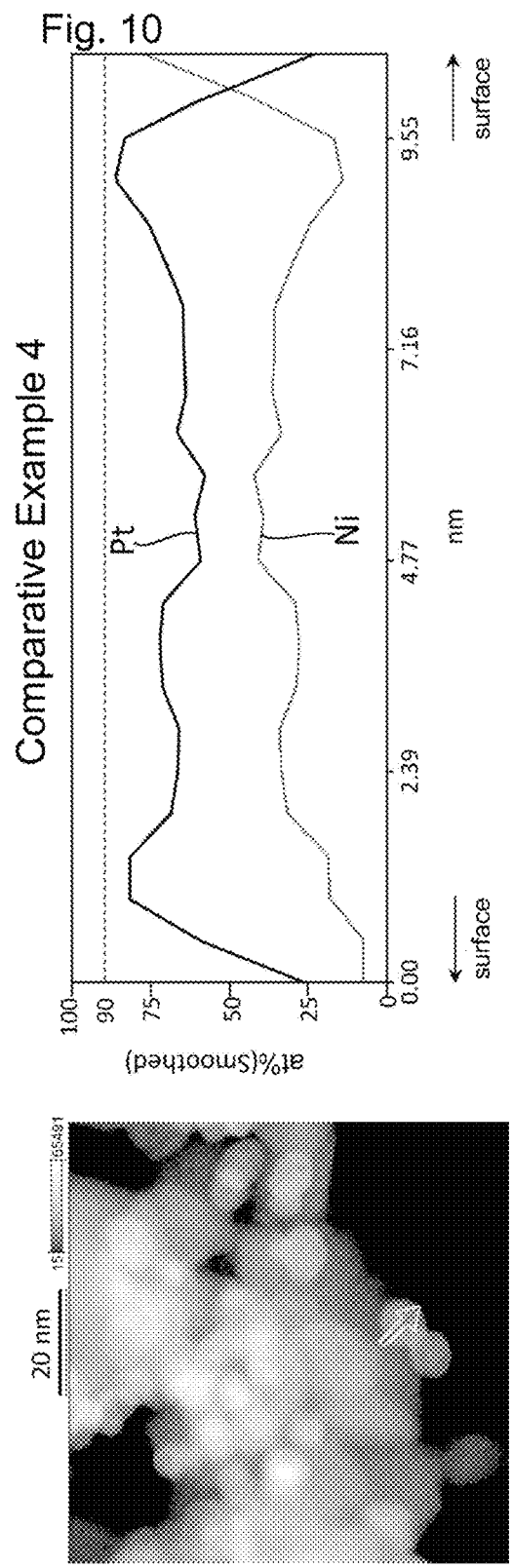
FIG. 10 shows the results of line analysis conducted using an STEM image and the results of EDS mapping, on a catalyst fine particle in the electrode catalyst obtained in Comparative Example 4.
Figure 11:
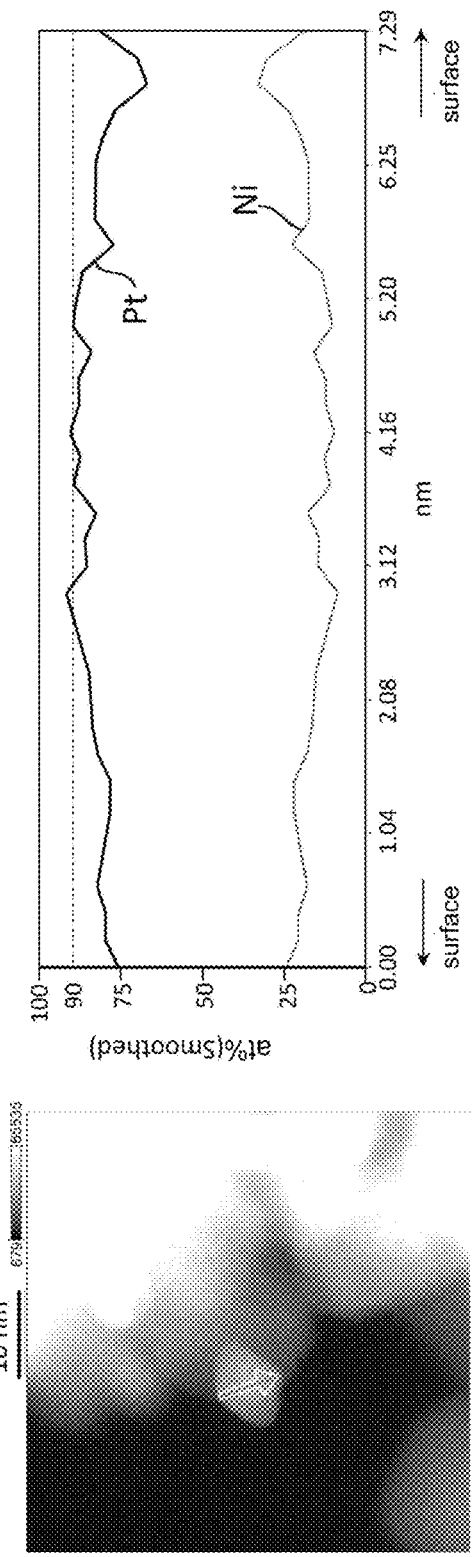
FIG. 11 shows the results of line analysis conducted using an STEM image and the results of EDS mapping, on a catalyst fine particle in the electrode catalyst obtained in Comparative Example 5.
Figure 12:
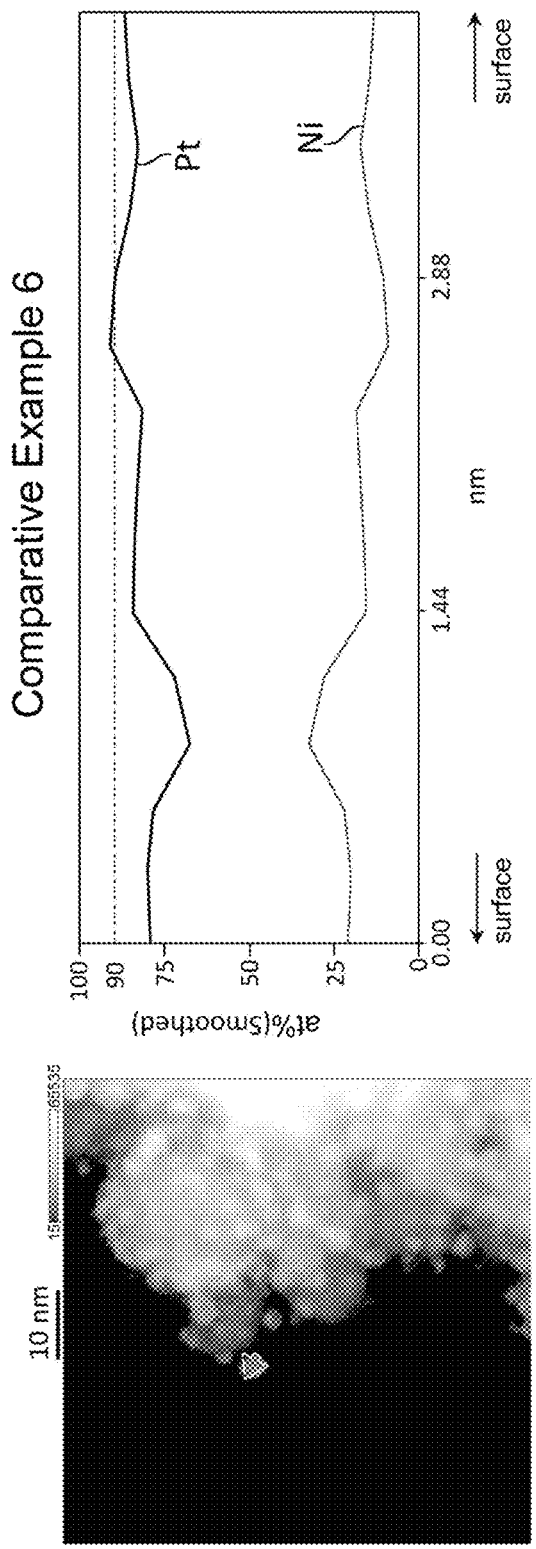
FIG. 12 shows the results of line analysis conducted using an STEM image and the results of EDS mapping, on a catalyst fine particle in the electrode catalyst obtained in Comparative Example 6.

As described above, the kinetic current density $j_k$ of a platinum-nickel alloy catalyst is increased by performing the heat treatment on the catalyst under vacuum or in a reducing atmosphere. The inventors of the present invention suppose that one of the reasons for this is that a platinum-concentrated layer is formed in the surface region of the platinum-nickel alloy. FIGS. 1 to 6 and FIGS. 7 to 13 show the results of line analysis conducted using an STEM image and the results of EDS mapping, with respect to the catalyst fine particles of the electrode catalysts obtained in Examples 1, 2, 3, 5, 7, and 8 as well as Comparative Examples 1 to 7. The results of line analysis shown in FIGS. 1 to 13 were obtained by performing line analysis from the tail end to the leading end of the arrows shown in the respective STEM images, and the analysis results at the tail end of the arrows correspond to the left end of the respective analysis graphs. In Comparative Example 1 shown in FIG. 7, the proportion of platinum is 90 at % only in the outermost surface; however, when the platinum-nickel alloy particle is regarded as a sphere having the radius "r", a platinum-concentrated layer, which is a region with the proportion of platinum being 90 at % or more extending continuously for a length at least 0.1×r, was not present in the surface region in Comparative Example 1. In each of Comparative Examples 2 to 5 as well, no platinum-concentrated layer was present in the surface region. In contrast, in each of Examples 1, 2, 3, 5, 7, and 8 shown in FIGS. 1 to 6, respectively, when the platinum-nickel alloy particle was regarded as a sphere having the radius "r", the presence of a platinum-concentrated layer, which is a region with the proportion of platinum being 90 at % or more extending continuously for a length at least 0.1×r was confirmed in the surface region. In each of the other examples, that is, Examples 4 and 6 as well, the presence of a platinum-concentrated layer was confirmed in the surface region of the platinum-nickel alloy as is the case with Example 1. In each of Comparative Examples 6 and 7 shown in Table 3, the electrode catalysts including a platinum-nickel alloy supported were prepared according to the colloidal method. Even when the same heat treatment as in Example 1 was performed on the electrode catalyst prepared according to the colloidal method, the kinetic current density $j_k$ did not improve, and also, the formation of a platinum-concentrated layer in the surface region of the platinum-nickel alloy was not confirmed as is the case with Comparative Example, as shown in FIGS. 12 and 13. The inventors of the present invention suppose that, when the degree of metallization of Sn prior to the heat treatment step is high, that is, the ratio of the tin element contained in the platinum-nickel alloy is high, the concentration of platinum is inhibited, and consequently, an improvement in the activity due to the heat treatment cannot be achieved.

INDUSTRIAL APPLICABILITY

According to the present invention, an electrode catalyst that has excellent catalytic performance such as kinetic current density can be easily produced.

The invention claimed is:

1. A method for producing an electrode catalyst, the method comprising:
a dispersion preparation step of mixing (i) at least one solvent selected from the group consisting of sulfoxide compounds and amide compounds, (ii) a catalyst support powder comprising a metal oxide, (iii) a platinum compound, and (iv) a transition metal compound, to thereby prepare a dispersion;
a supporting step of heating the dispersion, to thereby support a platinum alloy of platinum and the transition metal on the catalyst support powder;
a solid-liquid separation step of separating a dispersoid from the dispersion after the supporting step, to thereby obtain a catalyst powder comprising the catalyst support powder and the platinum alloy supported thereon; and
a heat treatment step of heating the catalyst powder under vacuum or in a reducing gas atmosphere,
wherein the at least one solvent has a formamide group and the transition metal compound includes water of crystallization, and the dispersion is heated such that a formic acid species is formed by reacting the at least one solvent with the water of crystallization in the supporting step,
wherein water or a water-containing compound is added in the dispersion preparation step in an amount such that the amount of water in the dispersion is from $1 \times 10^{-2}$ to $5 \times 10^{-1}$ mol/L inclusive with respect to the volume of the solvent in the dispersion.

2. The method for producing an electrode catalyst as set forth in claim 1, wherein the heat treatment step is performed under vacuum at a temperature equal to or higher than the heating temperature of the supporting step.

3. The method for producing an electrode catalyst as set forth in claim 2, wherein the heating temperature of the supporting step is from 120° C. to 175° C. inclusive.

4. The method for producing an electrode catalyst as set forth in claim 2, wherein, in the dispersion preparation step, an aromatic compound having a carboxyl group is further mixed.

5. The method for producing an electrode catalyst as set forth in claim 1, wherein the heat treatment step is performed in a reducing gas atmosphere at a temperature below 200° C.

6. The method for producing an electrode catalyst as set forth in claim 5, wherein the heating temperature of the supporting step is from 120° C. to 175° C. inclusive.

7. The method for producing an electrode catalyst as set forth in claim 5, wherein, in the dispersion preparation step, an aromatic compound having a carboxyl group is further mixed.

8. The method for producing an electrode catalyst as set forth in claim 1, wherein the heating temperature of the supporting step is from 120° C. to 175° C. inclusive.

9. The method for producing an electrode catalyst as set forth in claim 8, wherein, in the dispersion preparation step, an aromatic compound having a carboxyl group is further mixed.

10. The method for producing an electrode catalyst as set forth in claim 1, wherein, in the dispersion preparation step, an aromatic compound having a carboxyl group is further mixed.

11. The method for producing an electrode catalyst as set forth in claim 1, wherein a total concentration of formic acid species present in the dispersion is from $1 \times 10^{-5}$ to 1 mol/L inclusive with respect to the volume of the solvent in the dispersion.

* * * * *